United States Patent
Itou et al.

(10) Patent No.: US 10,690,972 B2
(45) Date of Patent: Jun. 23, 2020

(54) LIQUID CRYSTAL DISPLAY DEVICE

(71) Applicant: Japan Display Inc., Minato-ku (JP)

(72) Inventors: Osamu Itou, Minato-ku (JP);
Toshimasa Ishigaki, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 156 days.

(21) Appl. No.: 15/928,665

(22) Filed: Mar. 22, 2018

(65) Prior Publication Data

US 2018/0314118 A1 Nov. 1, 2018

(30) Foreign Application Priority Data

Apr. 28, 2017 (JP) ................................. 2017-089663

(51) Int. Cl.
*G02F 1/1343* (2006.01)
*G02F 1/1337* (2006.01)
(Continued)

(52) U.S. Cl.
CPC ........ *G02F 1/134363* (2013.01); *G02F 1/137* (2013.01); *G02F 1/1368* (2013.01); *G02F 1/13439* (2013.01); *G02F 1/133723* (2013.01); *G02F 1/136213* (2013.01); *G02F 1/136227* (2013.01); *G02F 1/136286* (2013.01); *G02F 1/133707* (2013.01); *G02F 2001/13685* (2013.01); *G02F 2001/13706* (2013.01); *G02F 2001/134318* (2013.01); *G02F 2001/134372* (2013.01); *G02F 2001/136222* (2013.01); *G02F 2201/121* (2013.01); *G02F 2201/122* (2013.01); *G02F 2201/123* (2013.01); *G02F 2202/104* (2013.01)

(58) Field of Classification Search
CPC ......... G02F 1/134363; G02F 1/136227; G02F 1/133345
See application file for complete search history.

(56) References Cited

U.S. PATENT DOCUMENTS 9,298,048 B2 3/2016 Sugiyama et al.
2010/0038648 A1* 2/2010 Cho .................. G02F 1/136227
257/72
(Continued)

FOREIGN PATENT DOCUMENTS

JP 2010-85810 4/2010
JP 2011-186010 9/2011

*Primary Examiner* — Lucy P Chien
(74) *Attorney, Agent, or Firm* — Oblon, McClelland, Maier & Neustadt, L.L.P.

(57) ABSTRACT

The purpose of the invention is to avoid the domain in high definition liquid crystal display devices. The representative structure is as follows. Scan lines extending in a first direction, video signal lines extending in a second direction, a pixel is formed in an area surrounded by the video signal lines and the scan lines, the pixel includes: a thin film transistor, a flattening film that covers the thin film transistor, a first electrode formed on the flattening film, a second electrode formed over the first electrode via an insulating film, and a contact hole that is formed in the flattening film to connect the first electrode and the thin film transistor; the second electrode is formed in common in plural pixels, and has a slit between the video signal lines; wherein the slit is formed continuously in a plurality of pixels arranged in the second direction.

4 Claims, 32 Drawing Sheets

(51) Int. Cl.
  *G02F 1/1362*  (2006.01)
  *G02F 1/1368*  (2006.01)
  *G02F 1/137*  (2006.01)

(56) References Cited

U.S. PATENT DOCUMENTS

| | | | |
|---|---|---|---|
| 2011/0216280 A1 | 9/2011 | Itou | |
| 2014/0104527 A1* | 4/2014 | Yang | H01L 27/1225<br>349/43 |
| 2016/0062203 A1* | 3/2016 | Ono | G02F 1/134363<br>349/43 |

* cited by examiner

LIQUID CRYSTAL DISPLAY DEVICE

CLAIM OF PRIORITY

The present application claims priority from Japanese Patent Application JP 2017-089663 filed on Apr. 28, 2017, the content of which is hereby incorporated by reference into this application.

BACKGROUND OF THE INVENTION

(1) Field of the Invention

The present invention relates to a display device, specifically a high definition liquid crystal display device, which is used for VR (virtual Reality) etc.

(2) Description of the Related Art

A liquid crystal display device has a TFT substrate, a counter substrate opposing to the TFT substrate, and a liquid crystal layer sandwiched between the TFT substrate and the counter substrate. The TFT substrate has plural pixels arranged in matrix form; each of the pixels has a pixel electrode and a thin film transistor (TFT). A transmittance of light in each of the pixel is controlled by liquid crystal molecules; thus, images are formed.

The liquid crystal display device has a problem in viewing angle characteristics. IPS (In Plane Switching) type liquid crystal display device has superior characteristics in viewing angle characteristics. On the other hand, when the display becomes high definition, a transmittance of light in the pixel becomes a problem. Namely, the ratio of the area of the contact hole or video signal lines, etc. that doesn't contribute to formation of displays becomes relatively bigger in the pixel. In addition, in the liquid crystal display device, the domain is generated due to a reverse rotation of the liquid crystal molecules in certain places; the light doesn't transmit the boundary between the domain and the normal region, thus, the a generation of the domain further decreases the transmittance of the pixel.

The patent document 1 (Japanese patent laid open 2011-186010) discloses the IPS type liquid crystal display device wherein the common electrode has a plurality of slits that extend in a horizontal direction; the slits are formed in common in horizontally and adjacently arranged pixels to avoid decreasing of transmittance of light in the pixel. The patent document 2 (Japanese patent laid open 2010-85810) discloses the IPS type liquid crystal display device wherein two areas, where rotating directions of liquid crystal are different to each other, are formed in a pixel; in each of the areas, the common electrode has a plurality of slits that extend in a direction slightly tilted from the horizontal direction, the slits are formed in common in horizontally and adjacently arranged pixels to avoid decreasing of transmittance of light in the pixel; the tilting directions of the slits in each of the areas are symmetry to each other with respect to the horizontal direction.

SUMMARY OF THE INVENTION

A market of the VR (virtual Reality) is expected to expand. A liquid crystal display device that is used in VR (virtual Reality) has to satisfy both characteristics of high definition, which is 1000 ppi (pixels per inch), and high response speed. There are some problems to overcome to realize such a liquid crystal display device.

One problem is a decrease in transmittance due to downsizing of the pixels. In addition to that, a domain, which is generated in the transmitting area in the pixel, decreases a transmittance of the pixel. Another problem is a decrease in holding capacitance. The holding capacitance is formed between the pixel electrode and the common electrode; when the pixel becomes smaller, the pixel electrode becomes smaller; as a result, the holding capacitance decreases. If the holding capacitance becomes smaller, the flickers in the display occur. Yet another problem is that: Moving pictures are often viewed in VR (virtual Reality), and etc., consequently, a speed of response of the liquid crystal molecules must be increased, thus, kinds of materials of the liquid crystal are limited.

The purpose of the present invention is to solve those problems, thus, to realize a super high definition liquid crystal display device that can display natural images.

The present invention overcomes the above explained problem; the concrete measures are as follows.

(1) A liquid crystal display device comprising: a scan line extends in a first direction, a video signal line extends in a direction of tilting angle of θ1 with respect to a second direction that is perpendicular to the first direction, and after crossing the scan line, the video signal line extends in a direction of tilting angle of −θ1 with respect to the second direction, a pixel is formed in an area surrounded by scan line and the video signal line;

wherein the pixel includes: a thin film transistor, a flattening film that covers the thin film transistor, a first electrode formed on the flattening film, a second electrode formed over the first electrode via a first insulating film, a third electrode formed over the second electrode via a second insulating film, and a contact hole that is formed in the flattening film to connect the second electrode and the thin film transistor, the first electrode is formed in common in plural pixels, the third electrode is formed in common in plural pixels, the third electrode has a slit in parallel to the video signal line; the slit is formed continuously in a plural pixels aligned in the second direction. (2) The liquid crystal display device according to (1), the slit bends so as that a tilting angle with respect to the second direction becomes bigger near the scan line.

DETAILED DESCRIPTION OF THE PREFERRED EMBODIMENTS

Figure 1A:
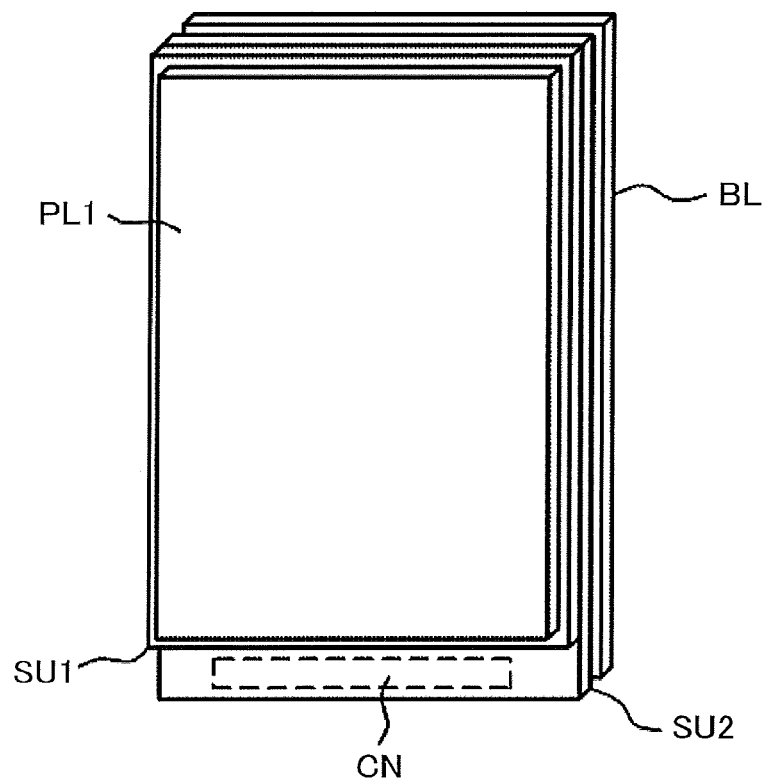
FIG. 1A is a perspective view according to the present invention.

A necessary holding capacitance per one pixel is determined by a leak of the thin film transistor; therefore, the same capacitance as in a case of 500 ppi (pixels per inch) is necessary even in a case of 1000 ppi. One example of the present invention is to have the following structure in order to maintain a necessary holding capacitance; that is to make the electrode a three layer structure, which enables to use the thin film transistor that includes poly-silicon in a channel, which is the most popular thin film transistor.

In a conventional FFS (Fringe Field Switching) structure, which is an example of the IPS, either one of the common electrode or the pixel electrode (herein after source electrode) that is nearer to the thin film transistor is made solid plane shaped, and another electrode is made the electrode of comb-like or the electrode having a slit. The present invention, however, adds another solid plane shaped electrode between the solid plane electrode and the thin film transistor, thus makes three layer structures, wherein a capacitance between the solid plane electrode and another solid plane electrode is added as the holding capacitance.

Positive type liquid crystal of low viscosity is appropriate to improve the response speed, however, the positive type liquid crystal molecules tend to generate domain at both edges of the pixel. The rotating direction of the liquid crystal molecules in the domain is reverse compared with the rotating direction of the liquid crystal molecules in the regular area. Each of the domains is separated by the regular region; however, a boundary between the regular region and the domain is very unstable. For example, if domains at edges of the pixel combine to each other, the boundary disappear; thus, the structure becomes stable; however, in a pixel of high definition display, a width of regular region is narrow; thus, some domains tend to combine to each other, on the contrary, some domains do not combine to each other, thus, structure becomes unstable.

If the bending portion of electrode is adopted for the pixel electrode to avoid domains at the end of the pixel, rotating angle of the liquid crystal molecules in response to electric field becomes smaller, thus, a transmittance of the pixel decreases. Further, if the bending portion of electrode is adopted in a high definition pixel, a relative ratio of the bending area becomes bigger in the pixel, thus, the transmittance is further decreased.

The present invention, as will be explained in the following embodiments, has the structure that the domain is less likely to occur, thus the necessary transmittance can be maintained even in a super high definition display. In addition, since the domain is less likely to occur, liberty in choosing the liquid crystal materials increases; consequently, the liquid crystal materials that enable high speed response can be adopted.

The present invention is explained in detail in the following embodiments.

First Embodiment

Figure 1B:
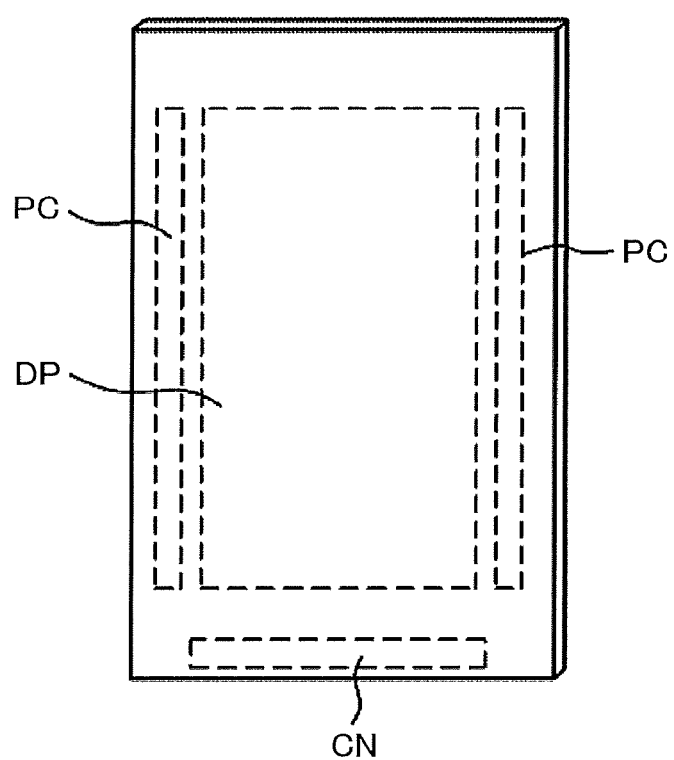
FIG. 1B is a plan view that shows the structure of the second substrate.

FIG. 1A is a perspective view that shows the structure of the liquid crystal display device; FIG. 1B is a plan view of the liquid crystal display device according to the present invention. As depicted in FIG. 1A, the first substrate SU1 and the second substrate SU2 sandwich the liquid crystal layer LC (see FIG. 3); the backlight BL is disposed to on the back of the second substrate SU2. FIG. 1B is a plan view of the second substrate SU2 viewed from the side of the liquid crystal layer LC. The peripheral circuit PC and the connection portion CN are formed at outer side of the display area DP, and the driving circuit is connected via the connection portion CN. The backlight BL comprises a light guide and a light source; the light source is a structure that the phosphor is laminated over the blue light emitting diode, consequently, the light source emits white light; the light source is disposed on a side surface of the light guide.

Figure 2A:
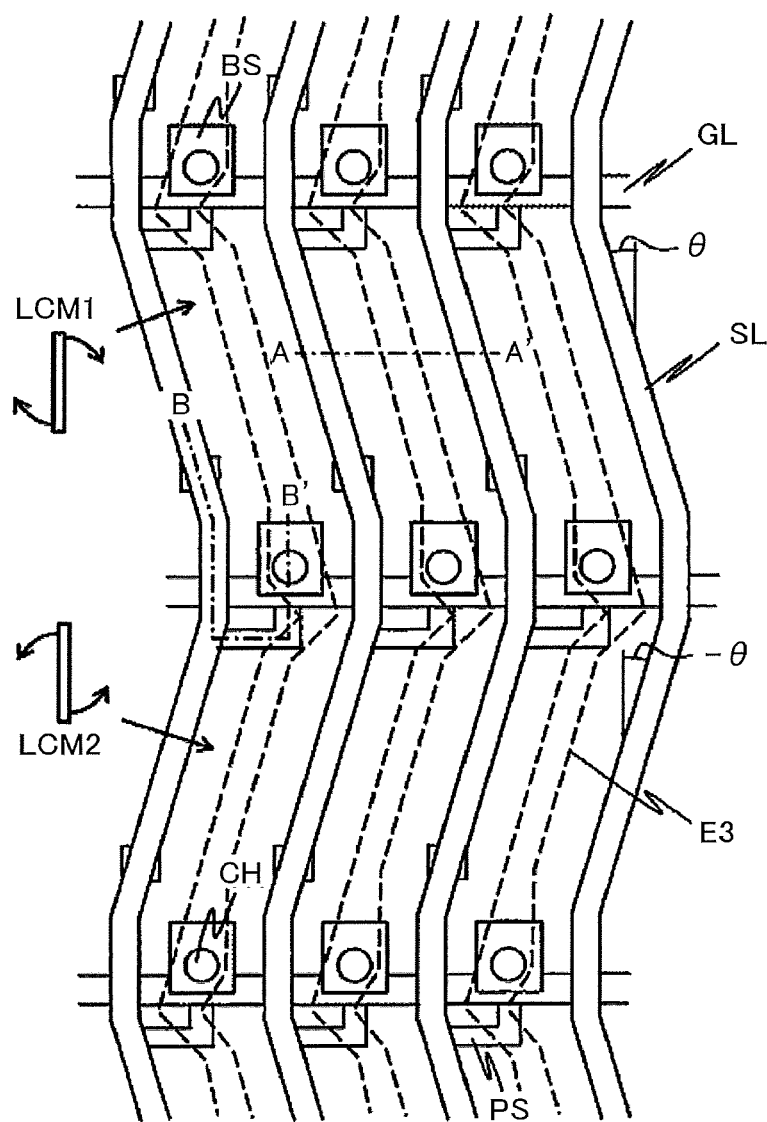
FIG. 2A is a plan view of the pixel according to first embodiment.
Figure 2B:
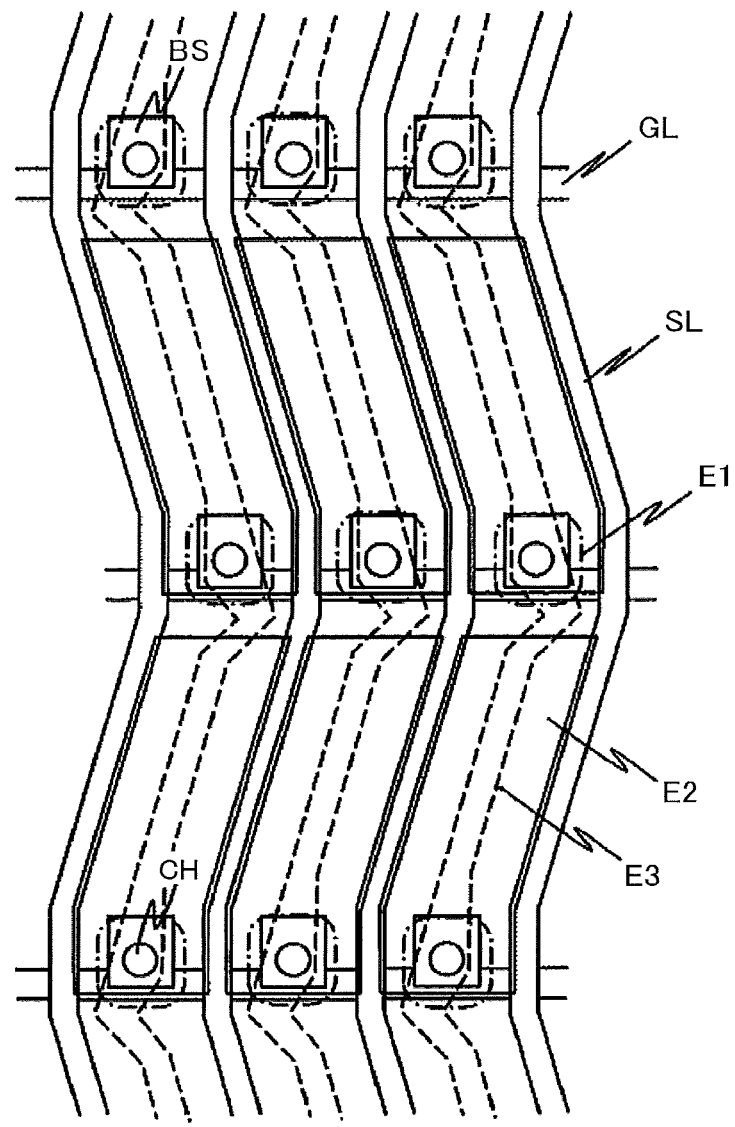
FIG. 2B is a plan view of the pixel according to first embodiment.

FIGS. 2A and 2B are plan views of the pixel according to the present invention. FIG. 2A is a plan view that includes six pixels and their surroundings on the second substrate SU2, namely, the video signal line SL, the scan line GL, the second electrode E2 (see FIG. 2B), the polysilicon layer PS, the base electrode layer BS, the contact hole CH. The polysilicon layer PS, which is formed at the cross area of the video signal line SL and the scan line GL, connects with the second electrode E2 at the contact hole CH via the base electrode layer BS. By the way, the contact hole CH is made through the second flattening film OC2, the fourth insulating film IL4 and the first electrode E1; the contact hole CH in FIGS. 2A and 2B is represented by the hole formed in the second flattening film OC2.

In FIG. 2A, the first direction X and the second direction Y cross to each other, the scan line GL extends in the first direction X. The video signal line SL extends in the second direction Y, however tilting with a first angle of θ in a first region and tilting with a second tilting angle of −θ in a second region with respect to the second direction Y.

FIG. 2B is a plan view that includes, the video signal line SL, the scan line GL, the base electrode layer BS, the contact hole CH, the second electrode E2 and the third electrode E3 on the second substrate SU2. The first electrode E1 is approximately a solid plane shape, but openings are formed with a certain spatial pitch in it; the opening includes the contact hole CH in it, thus, the first electrode E1 does not exist in the contact hole CH. The second electrode E2 exists in the area surrounded by the video signal line SL and the scan line GL; The second electrode E2 may overlap with both of or either of the video signal line SL and the scan line GL in a plan view; the second electrode E2 exists in the contact hole CH, too. The third electrode E3 is also approximately a solid plane shape, but slits, which extend approximately parallel to the video signal line SL, are formed in the pixels as depicted by broken line in FIG. 2B: the slit contains the contact hole CH in it.

In the meantime, the third electrode E3 is separated by the slit in the first direction X, however, a wiring, which is not shown in the figures, connects the separated third electrodes E3 to each other; thus, the third electrode E3 can be supplied with a common voltage.

Figure 3A:
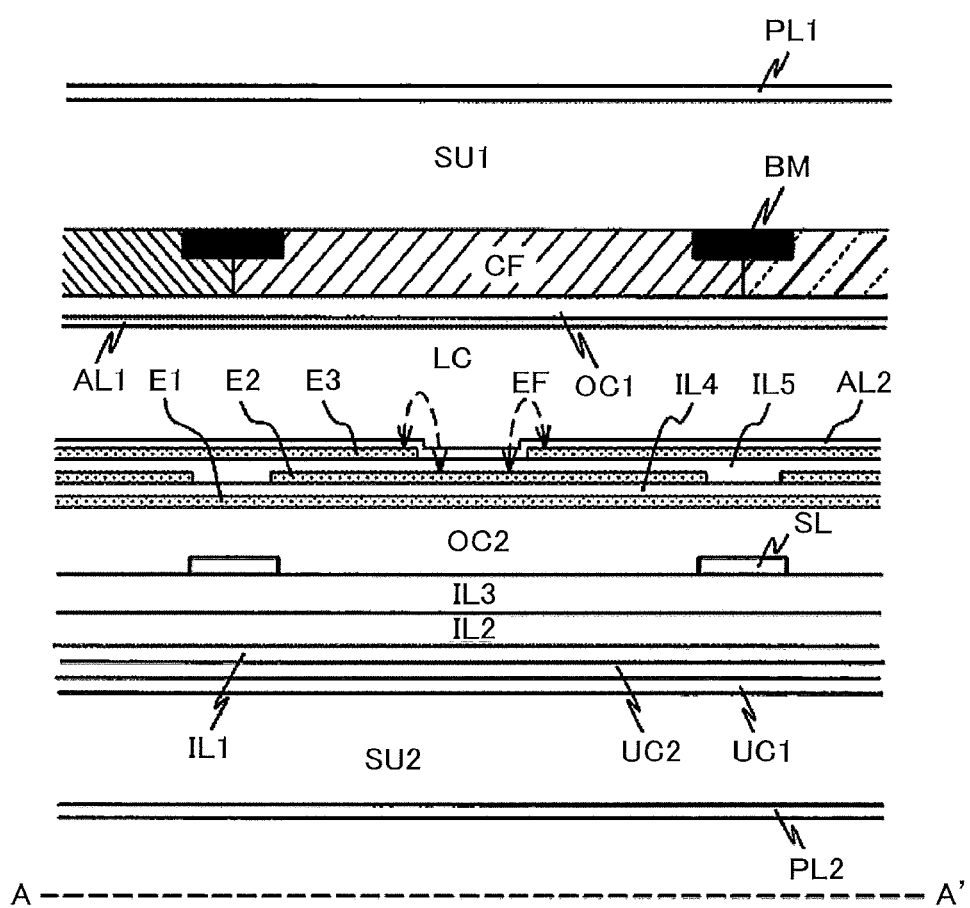
FIG. 3A is a cross sectional view along A-A' line in FIG. 2A.
Figure 3B:
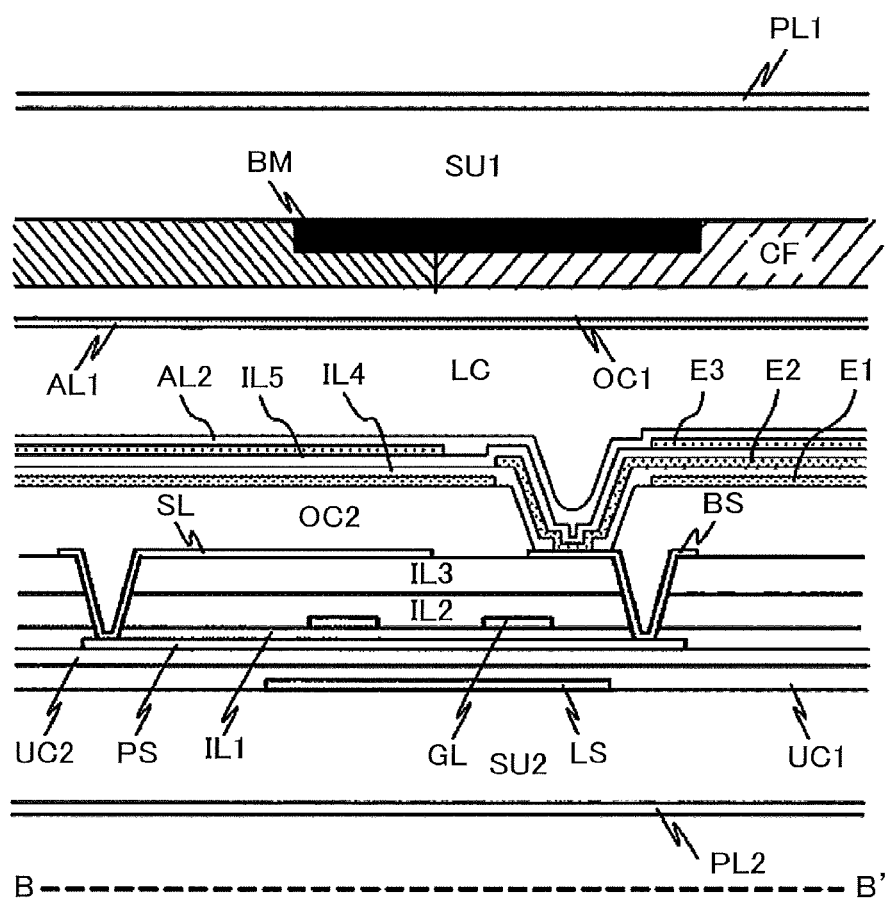
FIG. 3B is a cross sectional view along B-B' line in FIG. 2A.

FIG. 3A is a cross sectional view along the line A-A' in FIG. 2A; FIG. 3B a cross sectional view along the line B-B' in FIG. 2A. FIG. 3A is a cross sectional view at the center of the pixel; FIG. 3B is a cross sectional view that includes the active element. The first substrate SU1 is borosilicate glass of a thickness of 0.2 mm. The first alignment film AL1, the first flattening film OC1, the color filter CF, the black matrix BM are formed in this order from the liquid crystal layer LC side on the first substrate SU1.

The second substrate SU2 is borosilicate glass of a thickness of 0.2 mm like the first substrate. On the second substrate SU2, the following layers are formed in the order from the liquid crystal layer LC side; namely, the second alignment film AL2, the third electrode E3, the fifth insulating film IL5, the second electrode E2, the fourth insulating film IL4, the first electrode E1, the second flattening film OC2, the base electrode layer BS, the video signal line SL, the third insulating film IL3, the second insulating film IL2, the scan line GL, the first insulating film IL1, the polysilicon layer PS, the second under coat UC2, the first undercoat UC1 and the light shield layer LS.

The first alignment film AL1 is a polyimide film that is processed by optical alignment method; the first flattening film OC1 is a non-photosensitive transparent organic film; the black matrix BM is formed by negative type photoresist that includes black pigments. The color filter CF includes the red color filter RC, the green color filter GC and the blue color filter BC, which are repeated in certain spatial pitch. The red color filter RC, the green color filter GC and the blue color filter BC are all plane and stipe shaped and formed by negative type photoresist, wherein the red color filter RC contains red pigments, the green color filter contains green pigments and the blue color filter contains blue pigments. By the way, the laminating order of the color filter CF and the black matrix BM is not necessarily in this order. For example, if the black matrix BM is formed nearer to the liquid crystal layer LC, a color mixture due to the viewing angle can be decreased.

The second alignment film AL2 is a polyimide film that is processed by optical alignment method, as the same as the first alignment film AL1; the first electrode E1, the second electrode E2 and third electrode E3 are all formed by transparent metal-oxide conductive film as e.g. ITO (Indium Tin Oxide). The second electrode E2 is applied with a voltage of video signal; the first electrode E1 and the third electrode E3 are applied with the common voltage. The overlapping portion between the first electrode E1 and the second electrode E2, and the overlapping portion between the second electrode E2 and the third electrode E3 form the holding capacitance.

The fourth insulating film IL4 and the fifth insulating film IL5 are silicon nitride films, which are formed by low temperature process. The fifth insulating film IL5 is sandwiched by the third electrode E3 and the second electrode E2, which forms the holding capacitance; the fourth insulating film IL4 is sandwiched by the second electrode E2 and the first electrode E1, which also forms the holding capacitance. The second flattening film OC2 is a positive organic photoresist; the base electrode layer BS and the video signal line SL, formed on the same layer, are made of e.g. a laminated film of three layers of Ti, Aluminum (or Aluminum alloy), and Ti. The third insulating film IL3 is a silicon nitride film; the second insulating film IL2 and the first insulating film IL1 are silicon oxide films. The scan line GL and the light shield layer LS are made of e.g. molybdenum tungsten alloy film; the poly silicon layer PS is that amorphous silicon is transformed into poly silicon by laser annealing; the first under coat UC1 is a silicon nitride film and the second under coast UC2 is a silicon oxide film.

Post spacers, which are not shown in FIGS. 2A-3B, are set at cross areas of the video signal lines SL and the scan lines GL to hold the liquid crystal layer LC and to maintain the thickness of the liquid crystal layer uniform in the display area. The post spacers are columnar organic films that are formed on the first substrate SU1 or on the second substrate SU2. The post spacers can be formed on both of the first substrate SU1 and the second substrate SU2. In this case, the post spacers are made rod-like; the rod-like spacer of the first substrate SU1 and the rod-like spacer of the second substrate SU2 cross each other in a plan view, then the friction area is limited on the tops of the spacers when the pressing force is applied to the substrate SU1 or SU2; consequently, a degradation of contrast can be avoided.

The liquid crystal layer LC is formed by the material of positive dielectric anisotropy, which dielectric constant of the liquid crystal molecules in the alignment direction is bigger than that in the direction perpendicular to the alignment direction; the liquid crystal layer formed by the material of positive dielectric anisotropy has high electrical resistance and reveals nematic phase in a wide temperature range. The alignment state of the liquid crystal layer LC is homogeneous when no voltage is applied; FIG. 2A shows a model of the alignment state of the liquid crystal molecules LCM1 and LCM2, which are depicted by cylinders.

When voltage is applied between the third electrode E3 and the second electrode E2, the fringe field EF is formed in the liquid crystal layer LC at the vicinity of the slit of the third electrode E3. The liquid crystal display device of the present embodiment is FFS (Fringe Field Switching) type, wherein the fringe field EF that is depicted by an arrow of dotted line in the liquid crystal layer LC in FIG. 3A. Accordingly, the liquid crystal molecules LCM1 and LCM2 in the liquid crystal layer LC rotate their alignment direction in a plane of the liquid crystal layer LC as depicted by arrows in FIG. 2A.

The liquid crystal layer can be formed by the material of negative dielectric anisotropy, which dielectric constant of the liquid crystal molecules in the alignment direction is smaller than that in the direction perpendicular to the alignment direction; in that case, the alignment of the liquid crystal molecules LCM1 and LCM2 in the liquid crystal layer LC is rotated 90 degree with respect to the direction in FIG. 2A when no voltage is applied. The liquid crystal layer LC of a positive dielectric constant anisotropy has characteristics of a low viscosity and a superior response speed; the liquid crystal layer LC of a negative dielectric constant anisotropy has characteristics of more uniform alignment of the liquid crystal molecules when the voltage is applied, thus, gives a uniform and high transmittance.

The first polarizing plate PL1 is set on the upper side of the first substrate SU1 and the second polarizing plate PL2 is set on the lower side of the second substrate SU2. The absorbing axis of the first polarizing plate PL1 and the absorbing axis of the second polarizing plate PL2 are on a plane perpendicular to the normal axis of the liquid crystal panel; the absorbing axis of the second polarizing plate PL2 is parallel to the initial alignment direction of the liquid crystal molecules. According to the above relations between the alignment axis of the liquid crystal molecules and the polarizing axes of the first polarizing plate PL1 and the second polarizing plate PL2, the voltage-brightness characteristics of the normally black type liquid crystal display device is established, which displays black when the voltage is not applied while the transmittance increases when the voltage is applied.

In the FFS type, the liquid crystal molecules change their alignment direction as rotating in the plane of the liquid crystal layer LC; under a certain viewing angle, yellowish display and bluish display appear alternatively in every 90 degree in azimuth direction. In order to countermeasure this phenomenon, as depicted in FIGS. 2A and 2B, the pixel is made as parallelogram, the tilting angle of the parallelogram is made reverse between the adjacent pixels in the longitudinal direction. A pair of the pixels that the rotating angles of the liquid crystal molecules are in reverse direction to each other is adjacently repeated in the longitudinal direction, and further if the individual pixel is small enough, the coloring in the viewing angle is averaged. Therefore, the yellowish and the bluish are averaged and viewed as achromatic, consequently the problem of the coloring is eliminated.

In the FFS type, the electrode closest to the liquid crystal layer LC is comb like shape or plane shape having a slit. The third electrode E3 corresponds to this electrode in this embodiment. Since the third electrode E3 is applied with a common voltage it has a slit. When the liquid crystal display device becomes high definition display, only one slit can be formed in the pixel due to requirement of accuracy in manufacturing process.

If the base electrode layer BS is formed on the same layer as the video signal line SL is formed, manufacturing process can be simple; however, in a high definition display, the distances between the base electrode layer BS and each of the two video signal lines SL are made equal to avoid short. As a result, the base electrode layer BS is set at the center of the pixel in the lateral direction, consequently, the contact hole CH, which connects the base electrode layer BS and the second electrode E2 cannot substantially deviate from the center of the pixel.

The fringe field, which drives the liquid crystal layer LC, is generated at an edge of the slit; if this field is located near the boundary between adjacent two pixels, the alignment state of the liquid crystal molecules in the pixel affects the alignment of the liquid crystal molecules in the adjacent pixel. This phenomenon is not preferable since it deteriorates color purity especially when a primary color is displayed. Thus, the slit must be located at the center of the pixel in the high definition display at least in the place where the black matrix does not cover.

In this embodiment, the slit of the third electrode E3 is formed after the contact hole CH is formed; concretely, the photoresist is coated on the ITO, which is formed on the fifth insulating film IL5. In a high definition pixel, the diameter of the contact hole CH is limited so as to be less than a half of the width of the pixel. In addition, there is no space to avoid the overlapping of the video signal line SL and the first electrode E1 in a plan view, therefore, the thickness of the second flattening film must be thick enough to decrease parasitic capacitance between the video signal line SL and the first electrode E1. As a result, the contact hole CH becomes narrow and deep with reverse trapezoidal shape in a cross section; namely, the top diameter is 4 µm (herein after micron), the bottom diameter is 3 micron, and the depth is 3 micron in this embodiment. Herein after, the diameter of the contact hole CF means a diameter at the ½ depth.

When the photo resist is coated, the photoresist flows into the contact hole CH, thus, the thickness of the photoresist becomes locally thick in the contact hole CH. When the photoresist is patterned under a regular condition, in which the pattern is approximately the same as the pattern of the photo mask, the photoresist remains in the contact hole CH; on the contrary, when the photoresist is patterned under the condition that the photoresist in the contact hole CH is eliminated, the other portions where the photoresist is in regular thickness get significant over etching. Therefore, the boundary of the slit should not be formed in the contact hole CH; concretely, the contact hole CH is formed inside of the slit or the contact hole CH is formed outside of the slit. This embodiment is an example that the contact hole CH is formed inside of the slit.

Sometimes, a metal line is formed to decrease the resistance of the common electrode; in this case the metal wring is formed superposing the video signal line SL in a plan view. When the contact hole CH is formed inside of the slit as in the present embodiment, the metal line can be formed to laminate on the third electrode E3.

The axis of the liquid crystal molecule of positive dielectric constant anisotropy aligns with the direction of the field; the liquid crystal molecule in the liquid crystal layer LC changes its alignment direction by rotation in a plane of the liquid crystal layer LC in the FFS as described above.

Whether the rotating direction of the liquid crystal molecule is clock wise CW or anti-clock wise ACW is determined by the relation between the direction of the field EF and the initial alignment direction AD; the rotating direction is chosen so as that least rotating angle is necessary for the liquid crystal molecule to align with the field. In both of FIGS. 4A and 4B, the rotating angle is less in the anti-clock wise direction ACW, thus, the liquid crystal molecules in the liquid crystal layer LC rotate in the anti-clock wise direction. By the way, the notation E3 in FIGS. 4A and 4B means the slit in the third electrode E3.

Figure 4A:
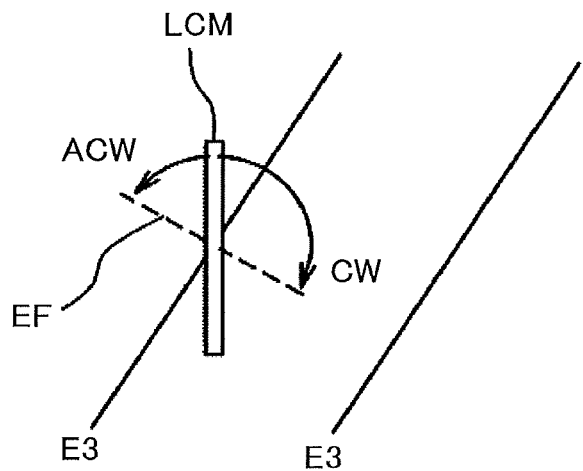
FIG. 4A is a model that shows behavior of the liquid crystal molecules.
Figure 4B:
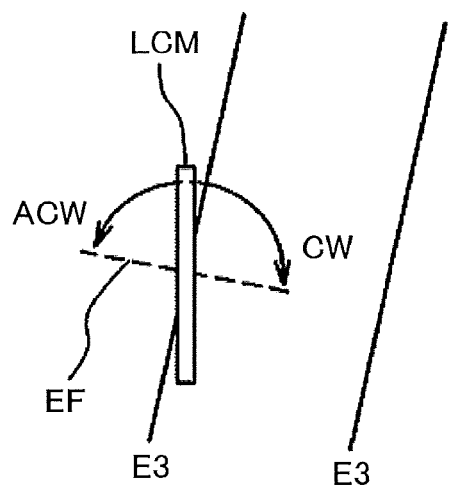
FIG. 4B is a model that shows behavior of the liquid crystal molecules.

As depicted in FIGS. 4A and 4B, if the difference in rotating angle between the clock wise direction CK and the anti-clock wise direction ACK is bigger, the rotating direction becomes stable, thus, generation of the domain, which is explained later, becomes less likely; however, the transmittance decreases due to less rotating angle when voltage is applied. If the angle between the extending direction of the slit and the initial alignment direction AL is defined as the alignment angle, the alignment angle is generally set approximately 10 degree to maintain the transmittance as big as possible as depicted in FIG. 4B. In this case, the difference in rotating angle between the clock wise CK direction and the anti-clock wise direction is small, thus, the domain, which is explained later, tends to appear.

Figure 5:
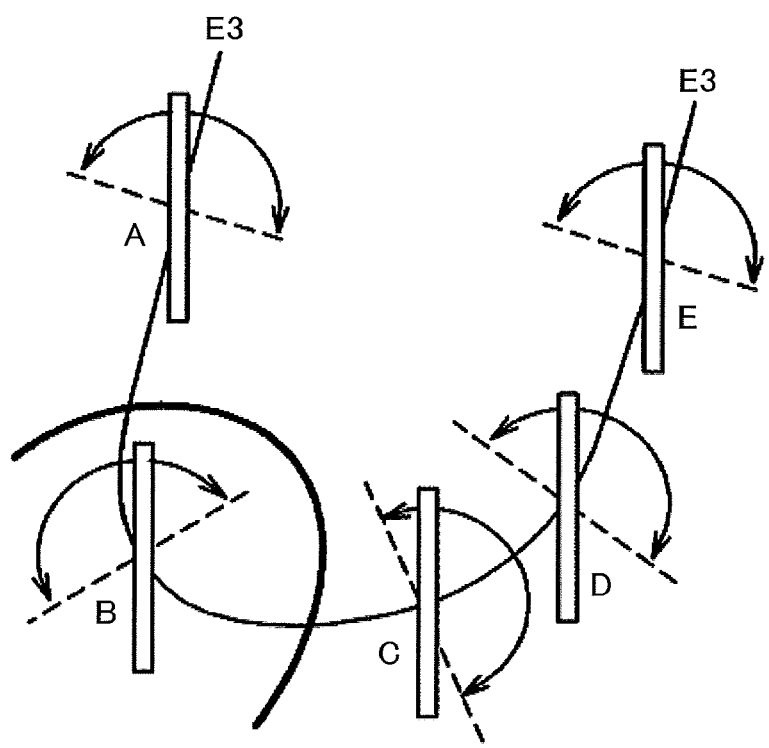
FIG. 5 is a model of domain.

If the size of the slit is limited in one pixel, namely, the ends of the slits are formed in one pixel, the directions of the field EF change 180 degree at the edge of the slit as depicted in FIG. 5. In FIG. 5, point A and point E, which is at an opposite side of the point A, are at the slit boundary; the direction of the field EF, along the boundary of the slit from point A to point B, rotates 180 degree. Therefore, the portion where a reverse direction is a smaller rotating direction for the liquid crystal molecule inevitably appears. FIG. 5 depicts examples of directions of the field at the edge of the slit, namely, at B point, C point and D point.

In FIG. 5, the rotating angle in the anti-clock wise direction ACW is smaller at point A and point E of the edge of the slit, while the rotating angle in the clock wise direction CW is smaller at point B of the edge of the slit. The portion where the rotating direction is reverse is called the domain; the force to rotate in the clock wise direction CW and the force to rotate in the anti-clock wise direction ACW compete to each other at the boundary of the domain and the normal region; thus, the liquid crystal molecules in the liquid crystal layer LC cannot move. In the FFS type, the characteristics of voltage—brightness characteristics is normally black, thus, the boundary becomes a black line. The domain boundary that is determined by the relation between the direction of the field EF and the initial alignment direction is depicted by thick line in FIG. 5.

In the boundary, the alignment of the liquid crystal molecule is nearly perpendicular to the direction of the field, the electrical energy is high; further the alignment energy is also high because the alignment directions of the liquid crystal molecule change drastically near the boundary. Therefore, the boundary between the domain and the normal region is very unstable, thus, the position of the boundary changes easily due to external stresses or thermal fluctuations; consequently, the area of the boundary may expand than the distribution of FIG. 5, which is determined by the relation between the direction of the field EF and the initial alignment direction AD.

The domain appears at both edges of the slit. For example, if two domains combine to each other, the boundary disappear, consequently, the liquid crystal layer LC becomes stable. Especially in high definition pixels, the pixel is small; therefore, the distance between the two domains at the edges of the slit is small, consequently, two domains ostensibly attract to each other, thus, the domains become more unstable. If the position of the domain is different in each of the pixels, the transmittance becomes different in each of the pixels, thus, unfavorable nonuniformity in brightness occurs. In addition, if the distribution of the domain changes in time, the nonuniformity looks like to be moving.

In order to fix the position of the domain at the edge of the slit, e.g. the slit can be bent at the edge of the slit to make rotating angle for the reverse rotation bigger. In this structure, however, the rotating angle of the liquid crystal molecules LCM decreases in the normal direction when the field is applied in the liquid crystal layer LC as depicted in FIG. 4A; thus, the transmittance at the bending portion of the slit decreases. The necessary size of the bending portion to stabilize the domain is constant regardless the size of the pixel, thus, high definition pixels get more influence of the decrease in transmittance.

In addition, the shape of the bending portion is easily affected by that etching condition of the ITO is whether over etching or under etching. In the case of under etching, e.g. the bending portion does not have enough length; therefore, a surplus length of the bending portion must be taken as a tolerance, which results in further decrease in transmittance. Therefore, as depicted in FIG. 2B, if the slits are connected between the pixels, the bending portion of the slit can be further shifted to the edge of the pixel in the longitudinal direction.

In this case a domain is generated at the place where the slit of the third electrode E3 and the boundary of the second electrode E2 cross; however, the position of the domain is at the boundary between the pixels, where the black matrix BM covers, and further, the domain does not easily move from the position. The influence of the under etching or the over etching to the shape of the slit does not occur because the slit is continuous in the plural pixels. Thus, both stabilizing the domain and high transmittance can be attained.

In this embodiment, three electrodes of the first electrode E1, the second electrode E2 and the third electrode E3 are formed; the overlapping portion of the first electrode E1 and the second electrode E2, and the overlapping portion of the second electrode E2 and the third electrode E3 form a holding capacitance; thus, enough holding capacitance can be formed even the area of the pixel is small; consequently displays without flicker can be realized.

In this structure, the third electrode E3 is the common electrode; thus, a slit that is continuous in the pixels can be formed in the third electrode E3 as depicted by the broken line in FIG. 2B. The slit, which is shown by the broken line in FIG. 2B, contains the contact hole CH inside; the slit is located at the center of the pixel and is continuous in the pixels; the tilting angle of the contour of the slit is bigger at the boundary between the pixels in the longitudinal direction, thus, the above described problem in the high definition pixels can be solved. Thanks to this slit structure and the location of the contact hole CH, the slit can be formed stably without interfering with the contact hole CH; thus, the nonuniformity in brightness can be avoided since the domain is stabilized, and high transmittance in the pixel can be realized.

Second Embodiment

Figure 6A:
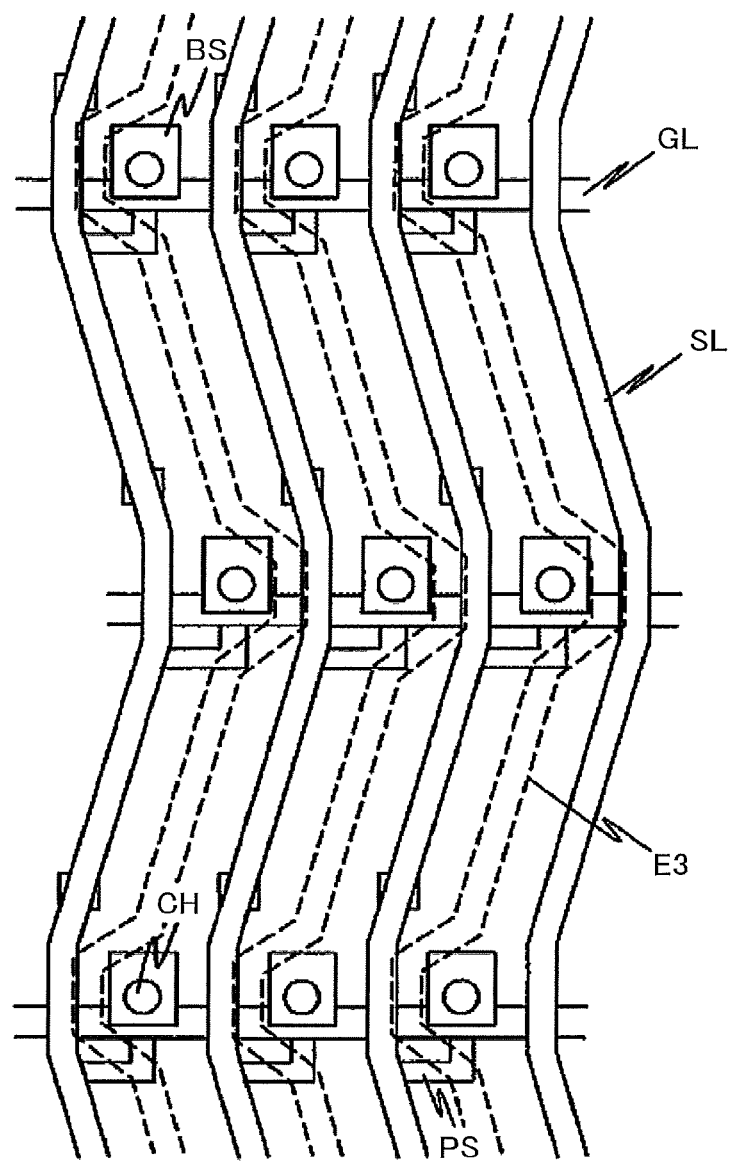
FIG. 6A is a plan view of the pixel according to second embodiment.
Figure 6B:
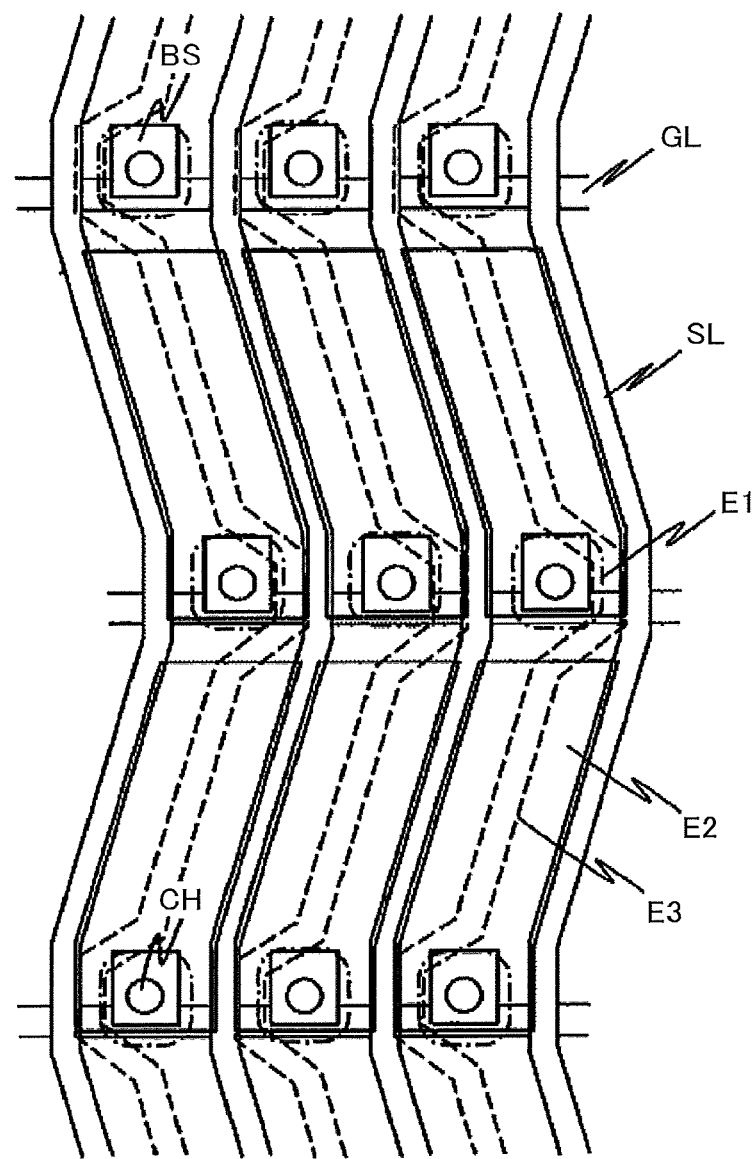
FIG. 6B is a plan view of the pixel according to second embodiment.

On the contrary to the first embodiment, in which the contact hole CH is formed inside of the slit, the contact hole CH is located outside of the slit in the second embodiment. FIGS. 6A and 6B are plan views of the pixel of the liquid crystal display device according to the present embodiment. FIG. 6A and FIG. 6B show the same structure; FIG. 6A shows the semiconductor layer PS while FIG. 6B shows the boundary (hole) of the first electrode E1, and the second electrode E2.

Since the contact hole CH must be located approximately at the center between the video signal lines SL, the slit structure of the third electrode E3 is changed to bypass the contact hole CH. Further, at the portion where the slit bypasses the contact hole CH, the tilting direction of the slit is made similar direction as the slit extends at the center of the pixel where the slit extends along the video signal line SL; thus, generation of the domain can be avoided at the bypass portion.

The distribution of the height of the surface of the second flattening film OC2 near the contact hole CH depends on the cross section of the color filter CF, if it is formed on the second substrate SU2, fluidity of the material for the second flattening film when it is coated, presence or absence of the middle bake in the baking process of the flattening film OC2. Therefore, there is a chance that the distribution of the height of the surface of the second flattening film OC2 changes gradually from the center of the contact hole CH to outer region, and further the distributions can be different from pixel to pixel.

When the third electrode E3 is patterned so that the contact hole CH is included in the slit, the edge of the slit exists near the contact hole CH; consequently, the thickness of the photoresist for patterning the third electrode changes from pixel to pixel. As a result, there was a chance that the variation in dimension of the slit around the contact hole CH occurs.

In the present embodiment, however, the slit of the third electrode E3 bypasses the contact hole CH in a plan view, as depicted in FIGS. 6A and 6B; consequently, the slit can be apart from the contact hole CH. As a result, the variation in the thickness of the photoresist for patterning the slit can be made smaller even when the distribution of the height of the surface of the second flattening film OC2 near the contact hole CH has a variation; consequently, the slits in the third electrode E3 can be made more uniformly.

Third Embodiment

Figure 7:
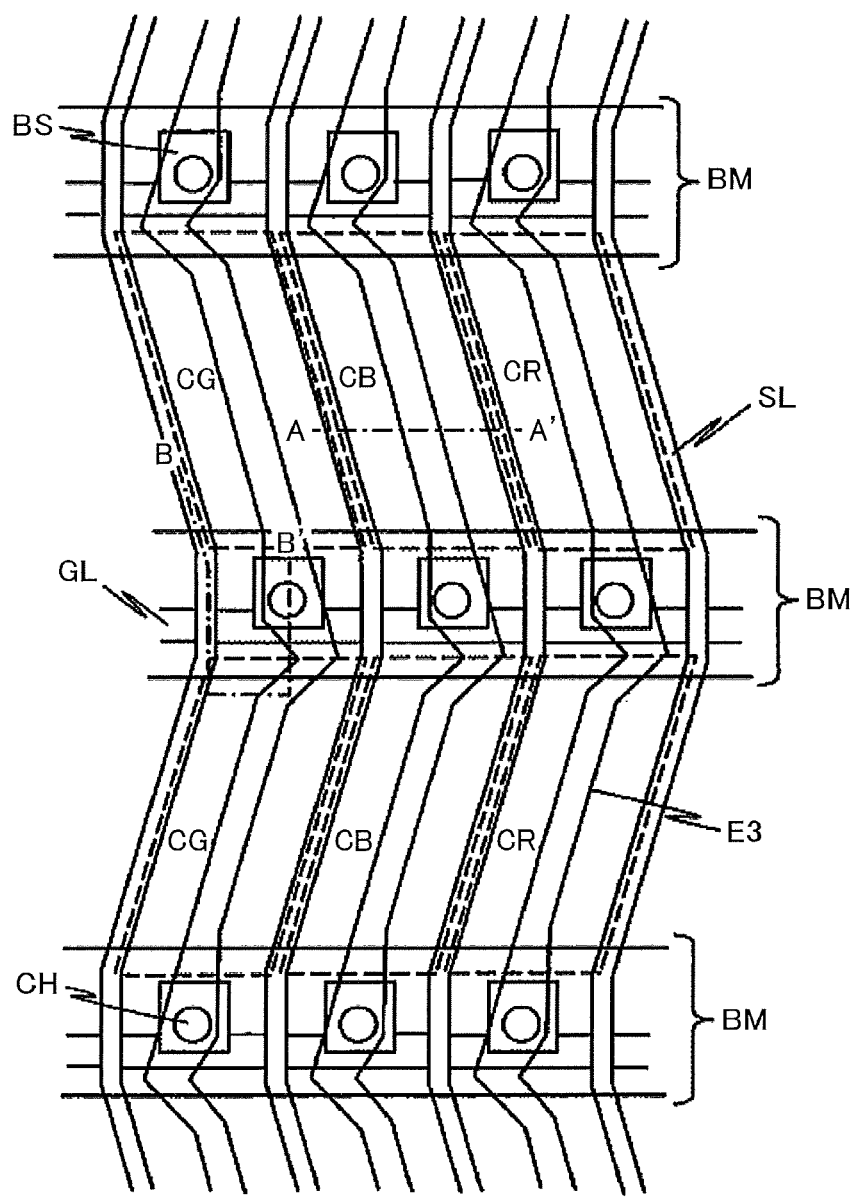
FIG. 7 is a plan view of the pixel according to third embodiment.

In the third embodiment, the color filter CF is set on the second substrate SU2, in contrast to the first embodiment, in which the color filter CF is formed on the first substrate SU1. FIG. 7 is a plan view of the second substrate SU2 on which the video signal line SL, the scan line GL, the base electrode layer BS, the red color filter RC, the green color filter GC, the blue color filter BC, the contact hole CH and the third electrode E3 are formed.

Figure 8A:
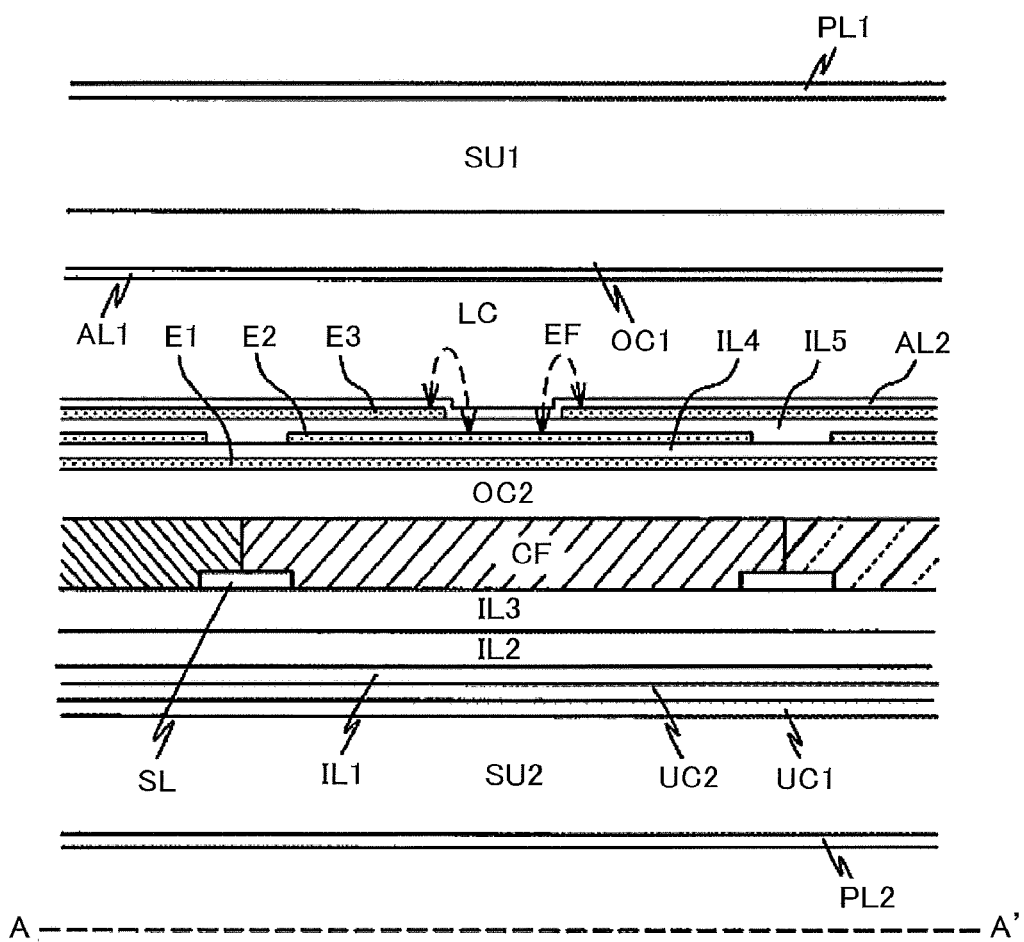
FIG. 8A is a cross sectional view along A-A' line in FIG. 7.
Figure 8B:
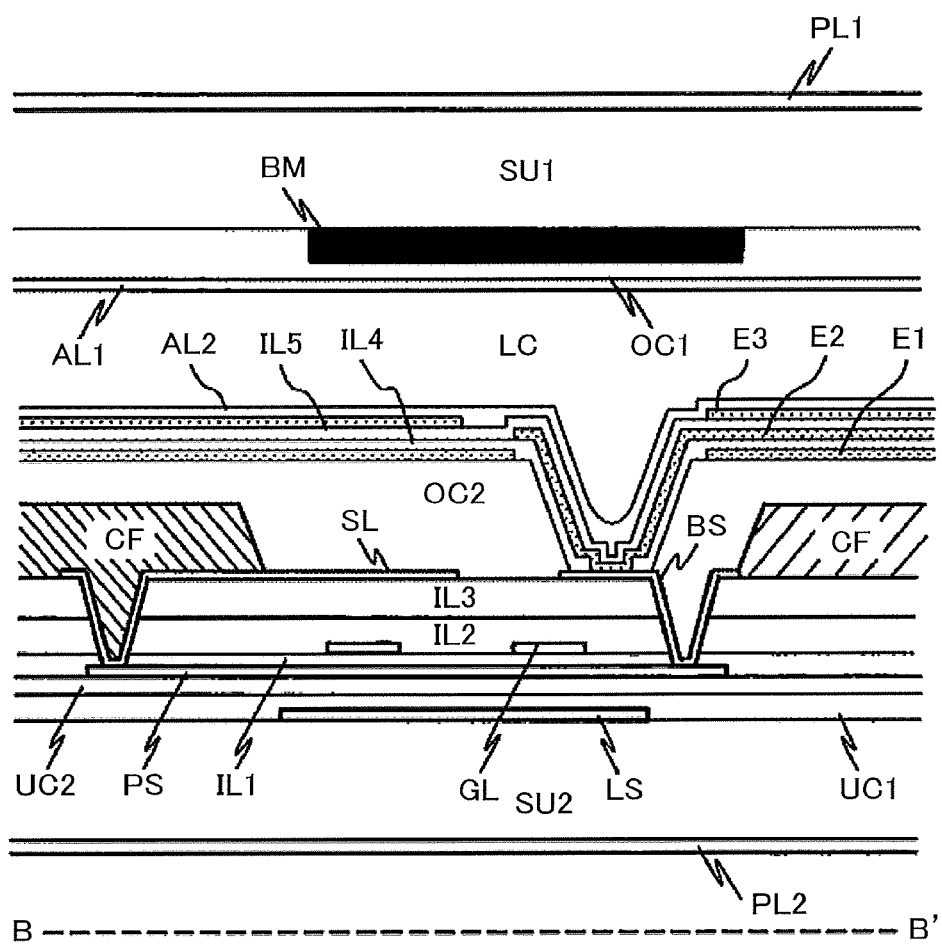
FIG. 8B is a cross sectional view along B-B' line in FIG. 7.

The red color filter RC, the green color filter GC and the blue color filter BC are shown by broken line in FIG. 7, and each one of them is repeatedly formed in the lattice that is formed by the video signal lines SL and the scan lines GL. FIG. 8A is a cross sectional view along A-A' line of FIG. 7; FIG. 8B is a cross sectional view along B-B' line of FIG. 7. FIG. 8A is a cross sectional view at the center of the pixel while FIG. 8B is a cross sectional view including the active element.

The first alignment film AL1, the first flattening film OC1 and the black matrix BM are formed from the side of the liquid crystal layer LC on the first substrate SU1. Comparing FIG. 8B with FIG. 3B, the color filter CF is added between the second flattening film OC2 and the third insulating film IL3 on the second substrate SU2 in the present embodiment.

The plan view of the video signal line SL, the scan line GL, the second electrode E2, the polysilicon layer PS, the base electrode layer BS and the contact hole CH on the second substrate SU2 in the liquid crystal display device according to the present embodiment is the same as FIG. 2A. Further, the plan view of the video signal line SL, the scan line GL, the base electrode layer BS, the contact hole CH, the second electrode E2 and the third electrode E3 on the second substrate SU2 in the liquid crystal display device according to the present embodiment is the same as FIG. 2B.

As described above, the liquid crystal display device according to the present embodiment is the COA (Color Filter on Array) type, in which the color filter CF is formed on the same substrate as the active element is formed. The COA type has a merit to decrease the color mixture due to the viewing angle. In the meantime, the color mixture due to the viewing angle is a specific phenomenon when primary color is displayed in the FFS type liquid crystal display device; wherein the hue changes when viewing angle, in polar angle, is changed when viewed in the direction that the different color filters are arranged. In the liquid crystal display device, the pixel and the color filter are set to correspond one to one. The color mixture due to the viewing angle occurs when the light passes the color filter that is not intended to pass.

Such a phenomenon of light pass occurs at the edge of the pixel regardless the size of the pixel; however, in the low definition pixel, the amount of the light passes the regular color filter is overwhelming, thus, the problem of the light mixture is not conspicuous. In high definition pixels, however, the ratio of the light that passes the wrong color filter compared to the light that passes the right color filter increases, thus, the color mixture due to the viewing angle becomes conspicuous in the high definition display. The reason is that: the width of the pixel is small in high definition pixels, therefore, the deviation between the color filter CF and the pixel, or the distance between the color filter CF and the pixel is not neglected with respect to the width of the pixel.

Forming the color filter CF on the array substrate can decrease a deviation between the color filter CF and the pixel, and further, can decrease the distance between the color filter CF and the pixel; therefore, the COA type has a merit in decreasing the color mixture due to the viewing angle. In the meantime, when the thicknesses of the first substrate SU1 and the second substrate SU2 become thinner, a positional deviation between the first substrate SU1 and the second substrate SU2 tends to occur; the COA type has a merit to overcome this problem. If color mixture due to the viewing angle doesn't occur, clear and pure color can be observed even viewed in an oblique direction to the screen.

Fourth Embodiment

In the fourth embodiment, the contact hole CH is slightly deviated from the center between the two video signal lines SL compared with the structure of the first embodiment. Since, in a plan view, the contact hole CH is near the lower side of the pixel which is approximately parallelogram, in this embodiment, the contact hole CH is deviated to the direction reverse to the direction that the parallelogram tilts. In reverse to the above structure, if the contact hole CH is near the top of the pixel, the contact hole CH is deviated to the same direction as the direction that the parallelogram tilts; that is the case when FIG. 9A and FIG. 9B are seen from upside down direction.

Figure 9A:
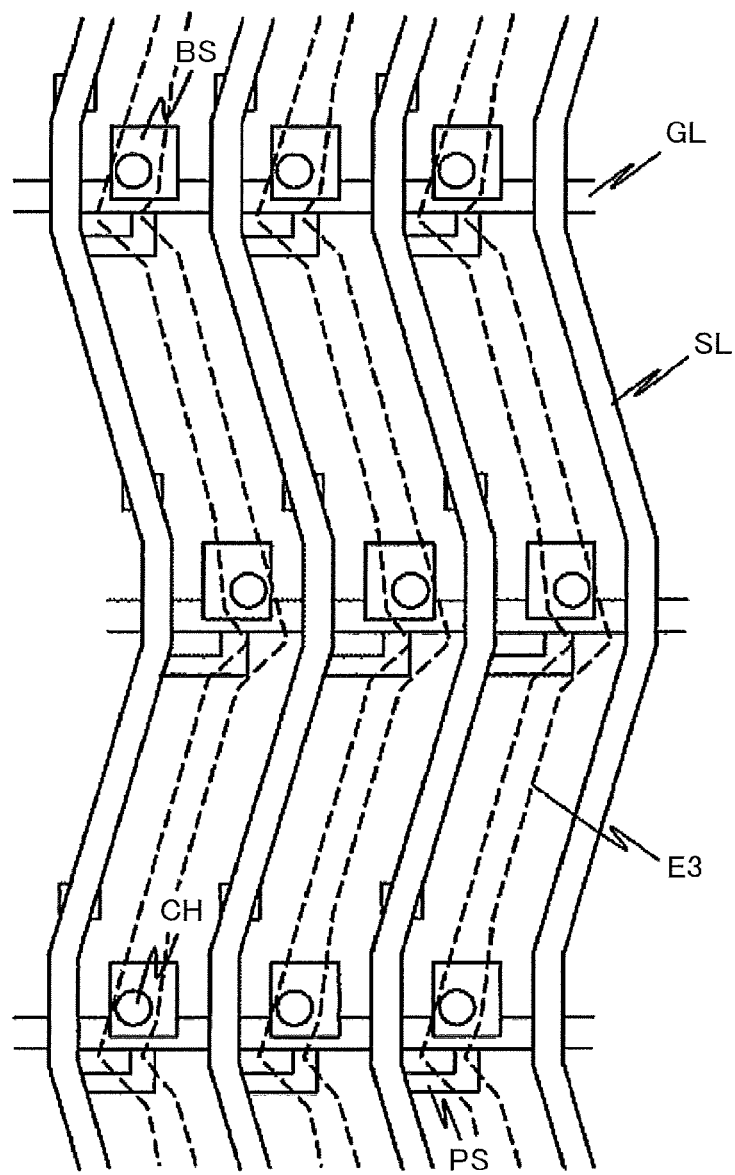
FIG. 9A is a plan view of the pixel according to fourth embodiment.
Figure 9B:
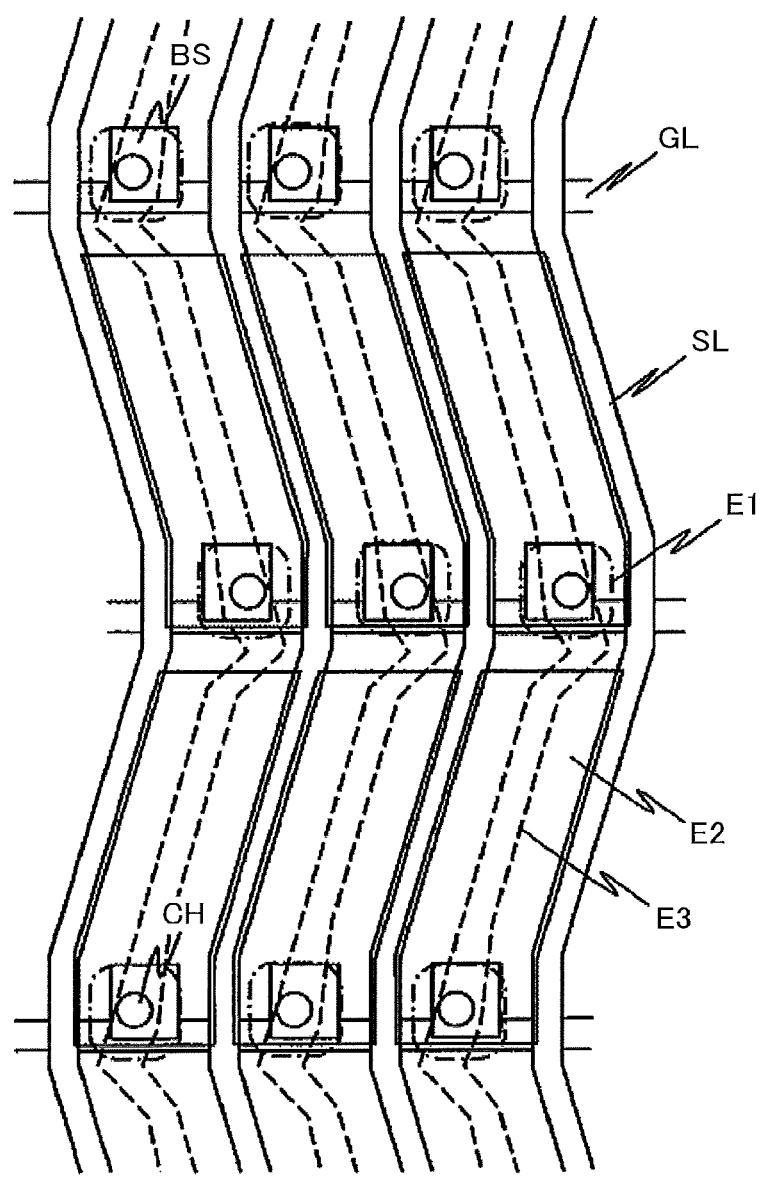
FIG. 9B is a plan view of the pixel according to fourth embodiment.

FIG. 9A and FIG. 9B are the plan views of the liquid crystal display device according to the present embodiment. FIG. 9A and FIG. 9B correspond to FIG. 2A and FIG. 2B of the first embodiment respectively. FIGS. 9A and 9B are plan views of the video signal line SL, the scan line GL, the base electrode layer BS, the contact hole CH, the second electrode E2 and the third electrode E3 on the second substrate SU2. As shown by the broken line in FIGS. 9A and 9B, a width of the slit of the third electrode E3 is narrower at the center of the pixel, and is wider at area that includes the contact hole CH.

The reason is as follows. In the center of the pixel, the width is determined so that: the liquid crystal layer LC is aligned thoroughly in the pixel; at the same time, the alignment in the pixel should not influence the alignment of the liquid crystal layer LC in the adjacent pixel. On the contrary, the width of the slit at the area that includes the contact hole CH must be wide enough to include the contact hole CH inside. In FIG. 2B, too, the slit in the center of the pixel and the slit in the region that includes contact hole CH are connected continuously, however in FIG. 2B, the tilt angle of one side edge of the slit changes so as to approach nearer to the vertical direction before the slit includes the contact hole CH, as a result the width of the slit increases at this region.

At the edge of the slit, a fringe field is generated, thus, the alignment of the liquid crystal molecules in the liquid crystal layer LC is changed; however, if the width of the slit is big, the edge of the slit becomes nearer to the boundary with the adjacent pixel; consequently, there is a chance that alignment of the liquid crystal molecules propagate to the adjacent pixel. The contact hole CH is covered and light shielded by the black matrix BM that is formed on the first substrate all, thus, color purity is not deteriorated even the width of the silt becomes bigger. However, if the width of the slit is wider than the optimum width at the region where apart from the contact hole CH, the alignment of the liquid crystal molecules propagates to the adjacent pixel; consequently, the color purity is deteriorated. To avoid this phenomenon, counter measures like decreasing the thickness of the liquid crystal layer were necessary.

In the present embodiment, the position of the contact hole CH is deviated from the center of the pixel in an amount of 1 micron. If the layout allows, the deviation can be more than 1 micron. In FIGS. 9A and 9B, the pixel is approximately parallelogram and the contact hole CH exists at the lower side of the pixel. The pixels in the upper row tilt in the right hand direction while the pixels in the lower row tilt in the left hand direction; the contact holes CH in the upper row are deviated 1 micron to the left and the contact holes CH in the lower row are deviated 1 micron to the right. Since the connection area between the base electrode layer BS and the contact hole CH is big enough, the connection between the base electrode layer BS and the second electrode E2 can be maintained even in this case.

When FIGS. 9A and 9B are compared with FIGS. 2A and 2B, it is apparent that, in this embodiment, vertically extending length of the contour of the slit near the contact hole CH is shorter in FIGS. 9A and 9B; thus, the area where the width of the slit is wider than the optimum value is decreased. As a result, range of choice of the liquid crystal material is enlarged with respect to the characteristics of birefringence; consequently, the liquid crystal material of low viscosity can be adopted, thus, response speed can be improved. In other words, since the domain is not tend to be generated in the structure of the present invention, the range of choice of the material is enlarged, as a result, the liquid crystal material of low viscosity can be adopted.

Fifth Embodiment

In the fifth embodiment, the contact hole CH is slightly deviated from the center between the two video signal lines SL compared with the same structure of the second embodiment. Since the contact hole CH is near the bottom of the pixel, which is approximately parallelogram, in this embodiment, the contact hole CH is deviated in the direction reverse to the direction that the parallelogram tilts. In reverse to the above structure, if the contact hole CH is near the top of the pixel, the contact hole CH is deviated in the same direction as the direction that the parallelogram tilts; that is the case when FIG. 10A and FIG. 10B are seen from upside down direction.

Figure 10A:
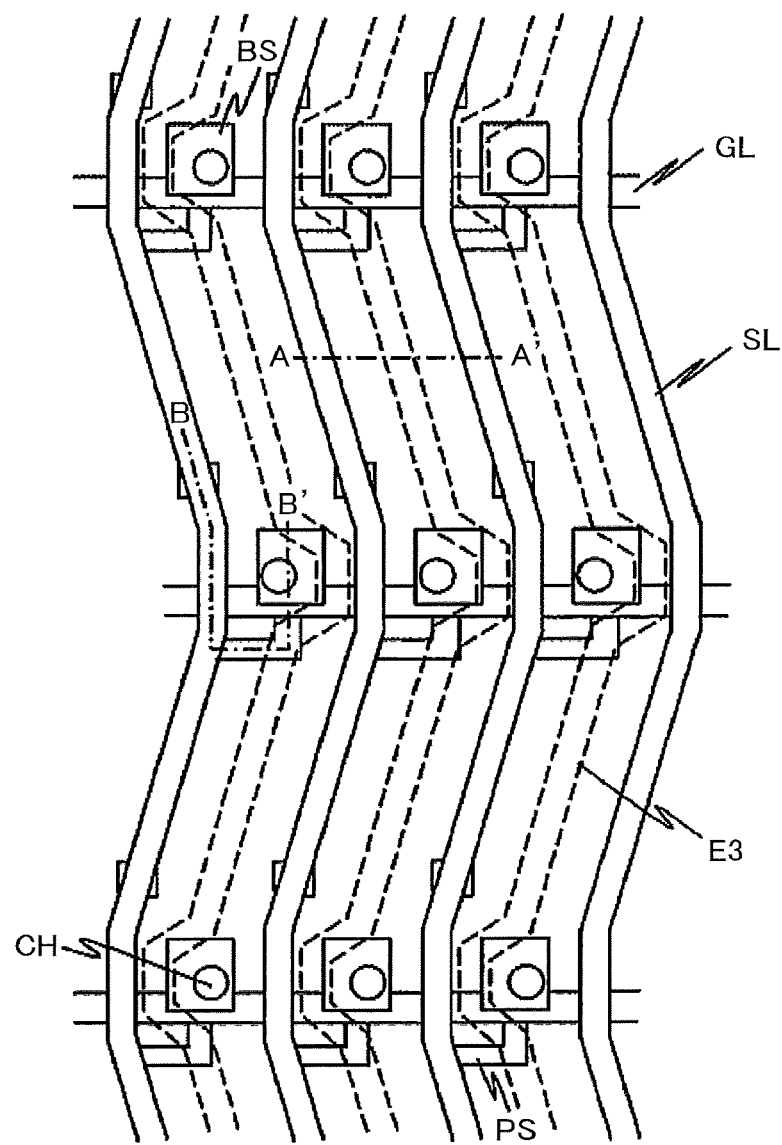
FIG. 10A is a plan view of the pixel according to fifth embodiment.
Figure 10B:
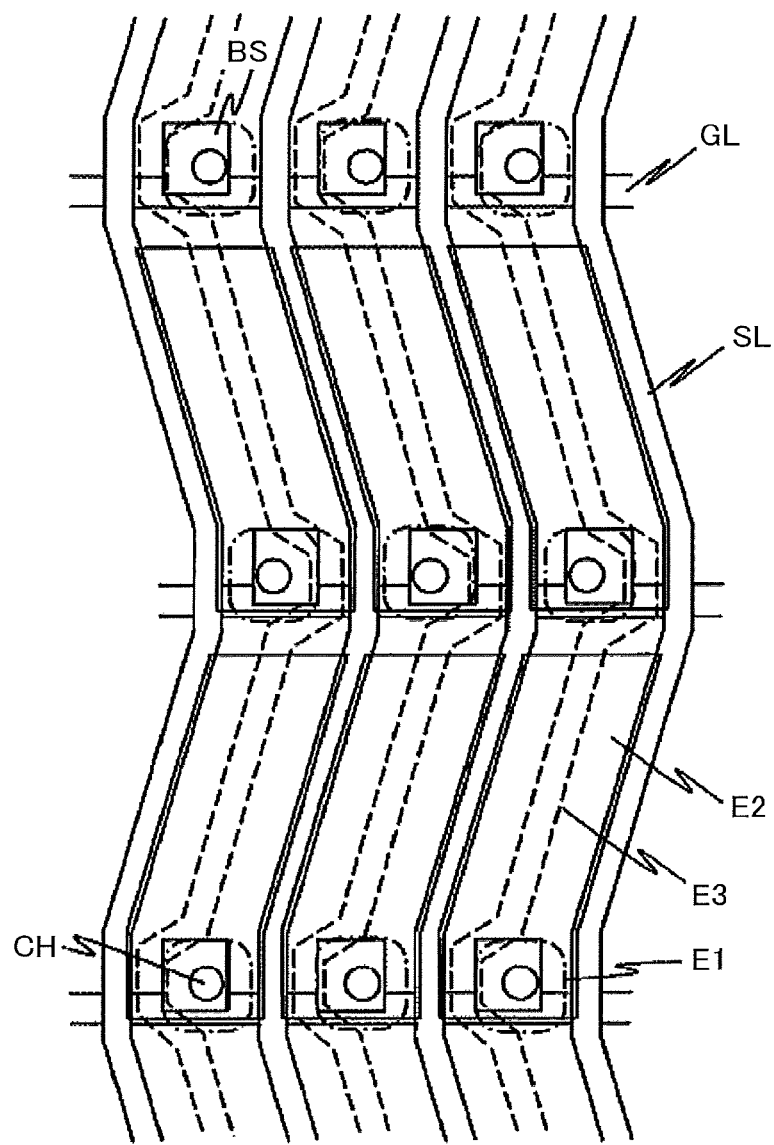
FIG. 10B is a plan view of the pixel according to fifth embodiment.

FIG. 10A and FIG. 10B correspond to FIG. 6A and FIG. 6B of the second embodiment respectively. FIGS. 10A and 10B are plan views of the video signal line SL, the scan line GL, the base electrode layer BS, the contact hole CH, the second electrode E2 and the third electrode E3 on the second substrate SU2. When FIGS. 10A and 10B are compared with FIGS. 6A and 6B, it is apparent that the area of the slit of the third electrode E3 to bypass the contact hole CH is decreased because the contact hole CH is deviated from the center of the base electrode layer BS. Thus, patterning of the slit of the third electrode E3 can be more stable. In addition to that, since the length of the slit that is not in bypass area can be longer, the transmittance can be improved in this embodiment.

Sixth Embodiment

Figure 11A:
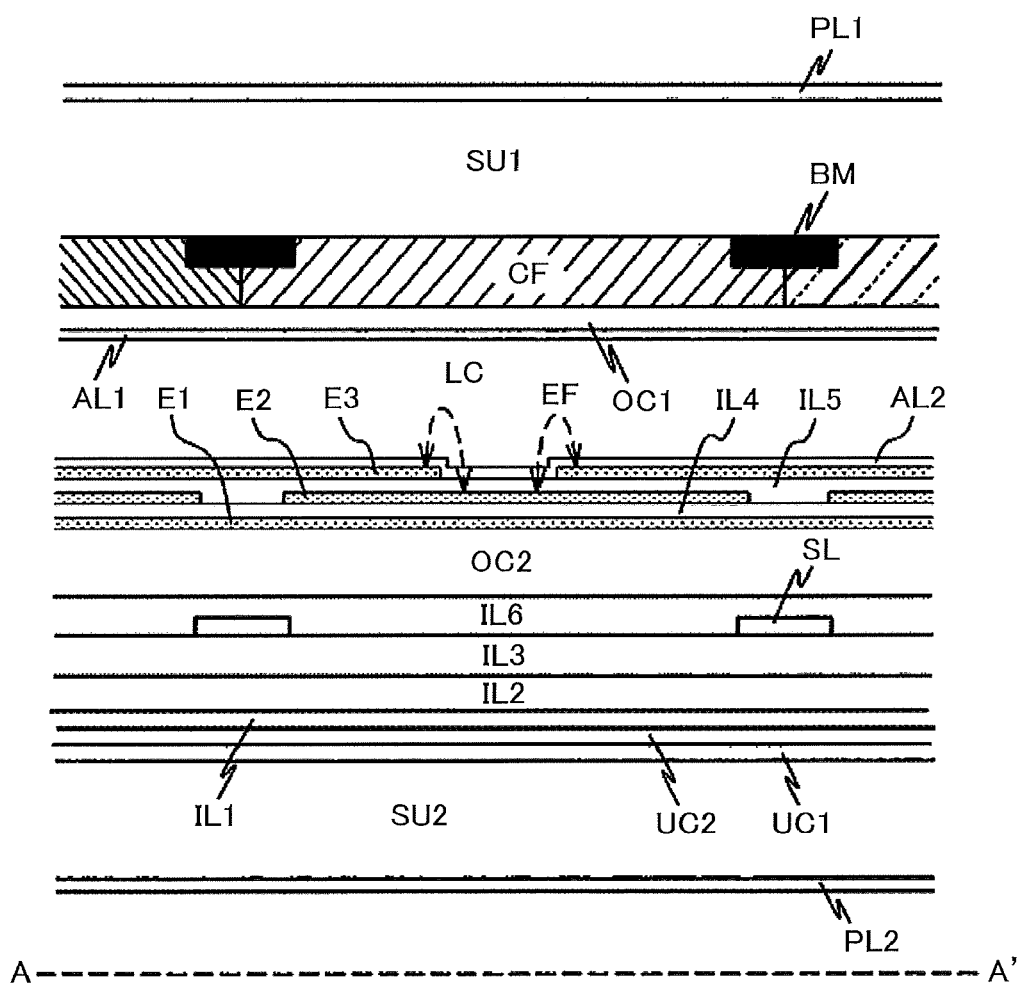
FIG. 11A is a cross sectional view along A-A' line in FIG. 12A.
Figure 11B:
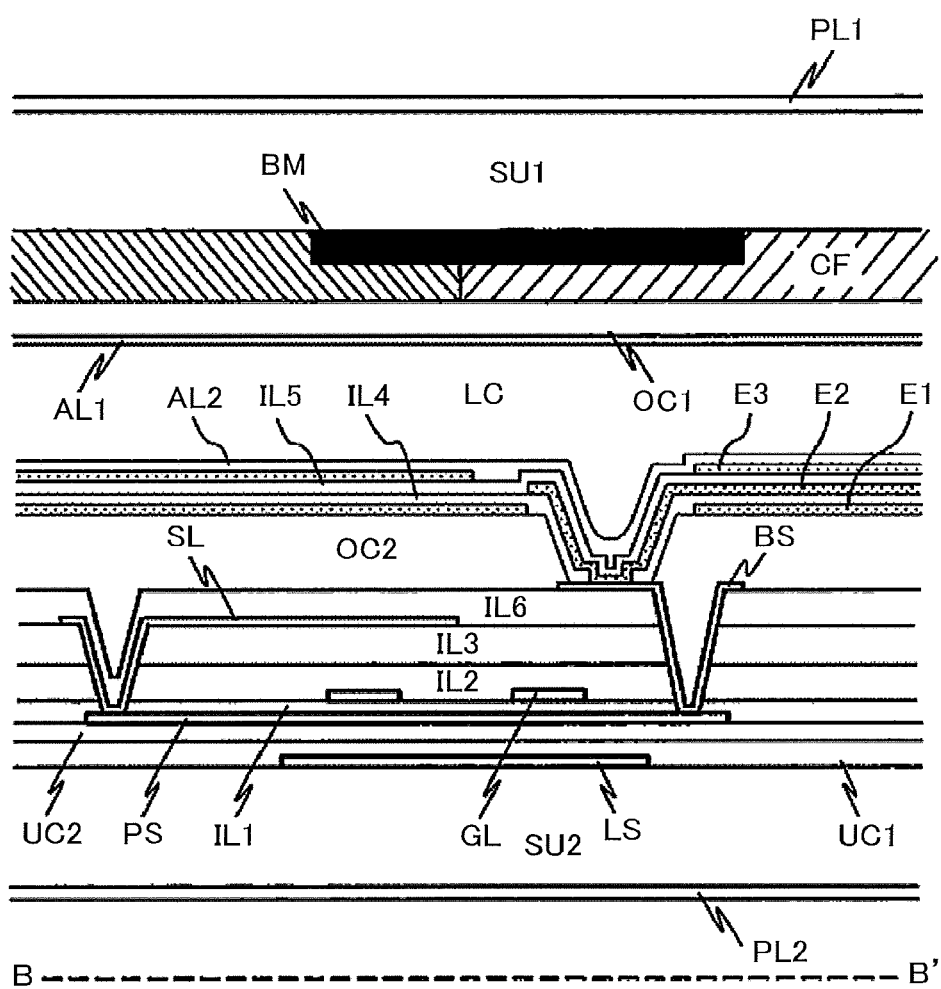
FIG. 11B is a cross sectional view along B-B' line in FIG. 12A.

In the sixth embodiment, as depicted in FIG. 11A and FIG. 11B, the video signal line SL and the base electrode layer BS are formed on different layers compared with the structure of the first embodiment. Concretely, the sixth insulating film IL6 is formed between the video signal line SL and the base electrode layer BS; the contact hole for the connection between the poly-silicon layer PS and the base electrode layer BS is made through the sixth insulating film IL6.

Figure 12A:
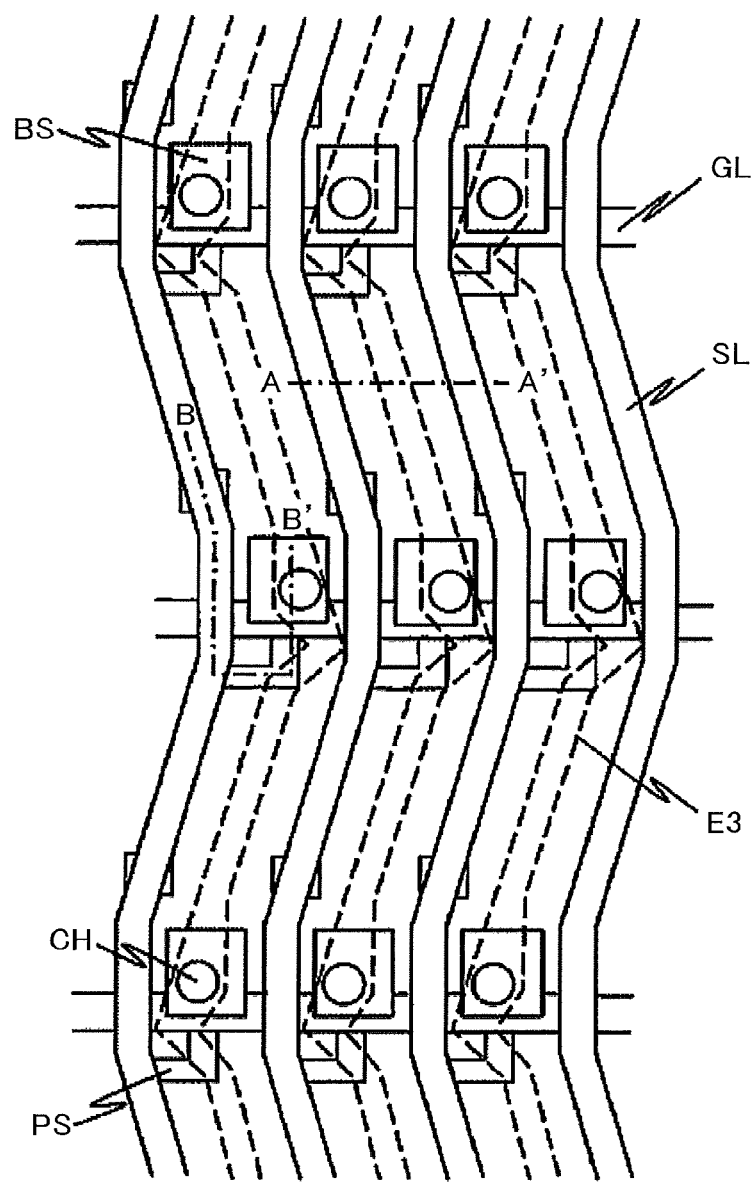
FIG. 12A is a plan view of the pixel according to sixth embodiment.

FIG. 11A is a cross sectional view at the center of the pixel while FIG. 11B is a cross sectional view at the area that includes the low temperature poly-silicon PS. FIG. 11A is a cross sectional view along the A-A' line of FIG. 12A; FIG. 11B is a cross sectional view along the B-B' line of FIG. 12A. FIG. 12A corresponds to FIG. 2A while FIG. 12B corresponds to FIG. 2B. Comparing FIGS. 12A and 12B with FIGS. 2A and 2B, it is apparent that the distance between the video signal line SL and the base electrode layer BS is less in the present embodiment, namely, FIGS. 12A and 12B; as a result, the size of the pixel is diminished in this embodiment. Since the video signal line SL and the base electrode layer BS are formed on the different layers in this embodiment, a short between the video signal line SL and the base electrode layer BS does not occur; therefore, a high definition pixels that has narrower pixels than that of the first embodiment can be realized.

Figure 12B:
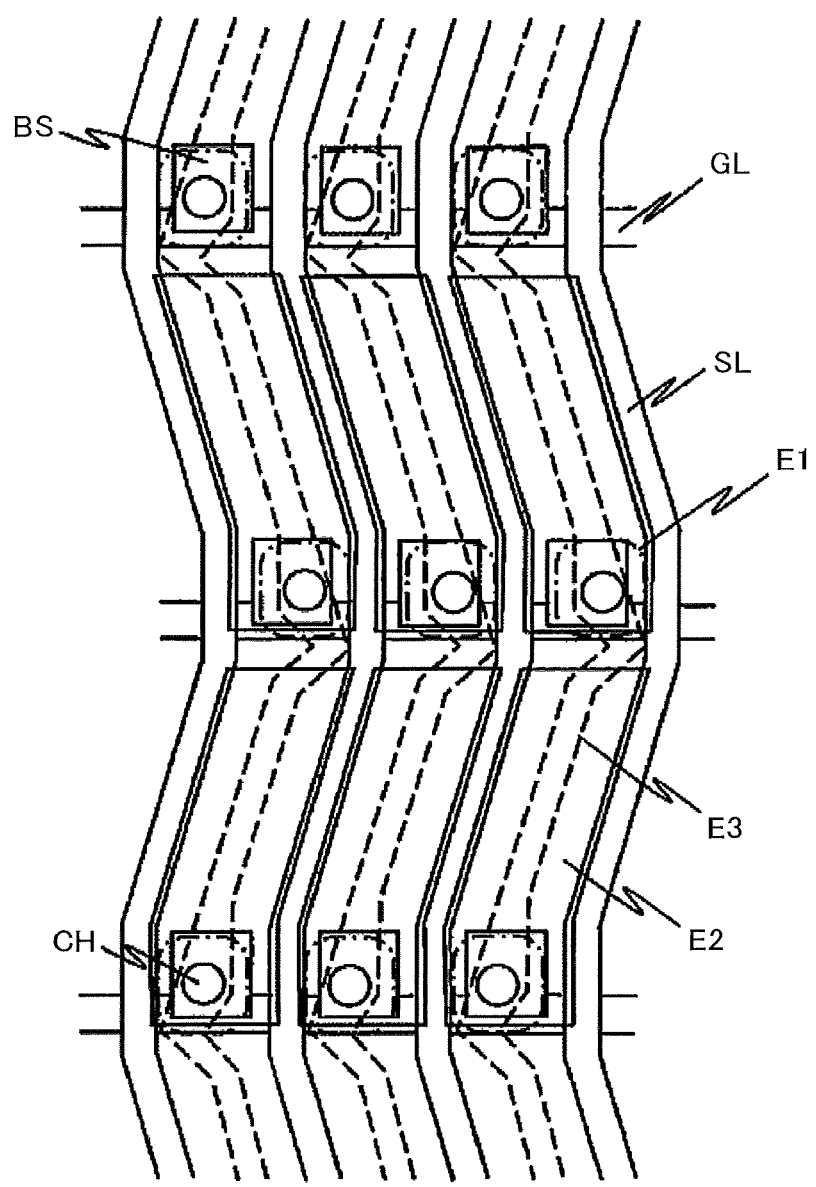
FIG. 12B is a plan view of the pixel according to sixth embodiment.

On the other hand, parasitic capacitance between the video signal line SL and the base electrode layer BS should be decreased. For example, if the video signal line SL and the base electrode layer BS overlap in a plan view, the parasitic capacitance increases. If the thickness of the sixth insulating film IL6 is increased, the parasitic capacitance decreases; however, a contact becomes difficult between the base electrode layer BS and the poly-silicon layer PS. Therefore, the video signal line SL and the base electrode layer BS should be disposed so as not to overlap to each other in a plan view; further, it is best to set the base electrode layer BS at the center between the two video signal lines SL to decrease the parasitic capacitance as depicted in FIGS. 12A and 12B.

As described above, the base electrode layer BS is at the center between the two video signal lines SL even when the video signal line SL and the base electrode layer BS are formed on the different layers. As a result, the contact hole CH is also at the center of the pixel; consequently, the portion of the slit that is not covered by the black matrix BM should be at the center of the pixel.

The slit of the third electrode E3 either includes the contact hole CH inside or bypasses the contact hole CH in a plan view; FIGS. 12A and 12B is are the former structure. In this case, too, the holding capacitance can be maintained, domain can be stably fixed, and further, high transmittance of the light can be attained.

Seventh Embodiment

Figure 13A:
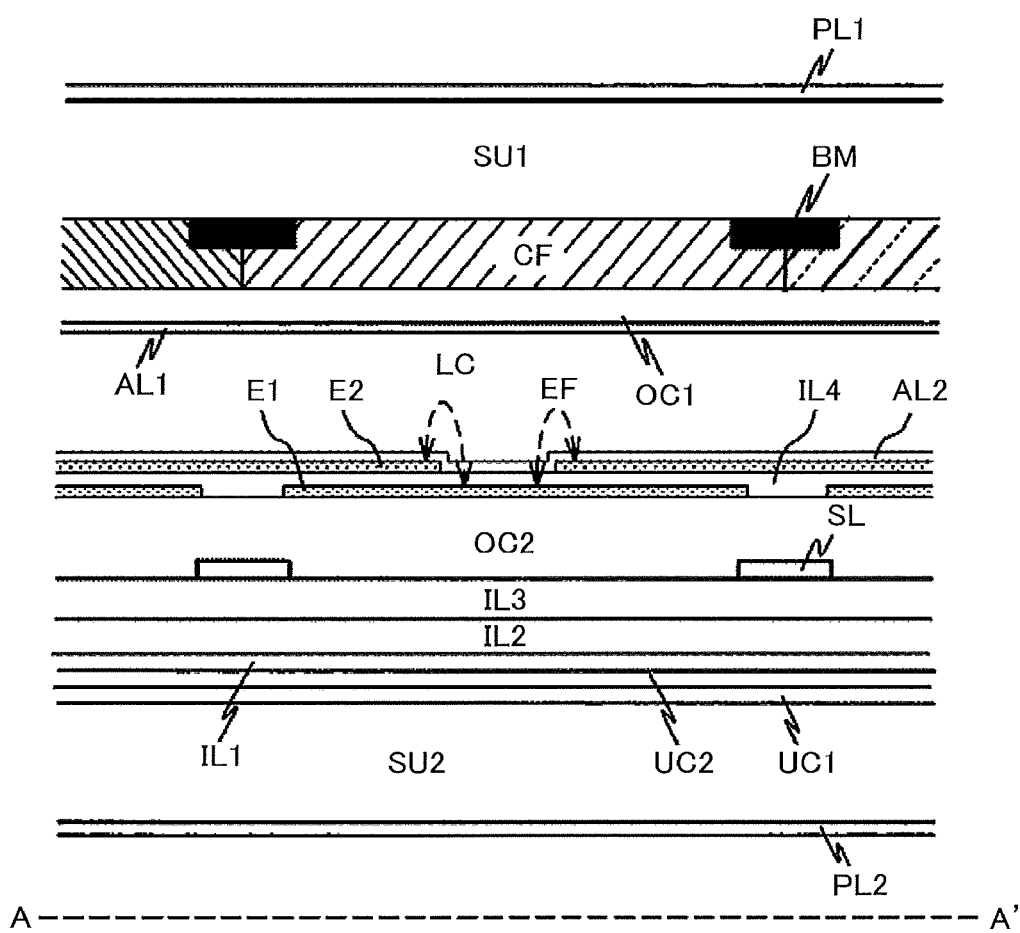
FIG. 13A is a cross sectional view along A-A' line in FIG. 2A according to seventh embodiment.
Figure 13B:
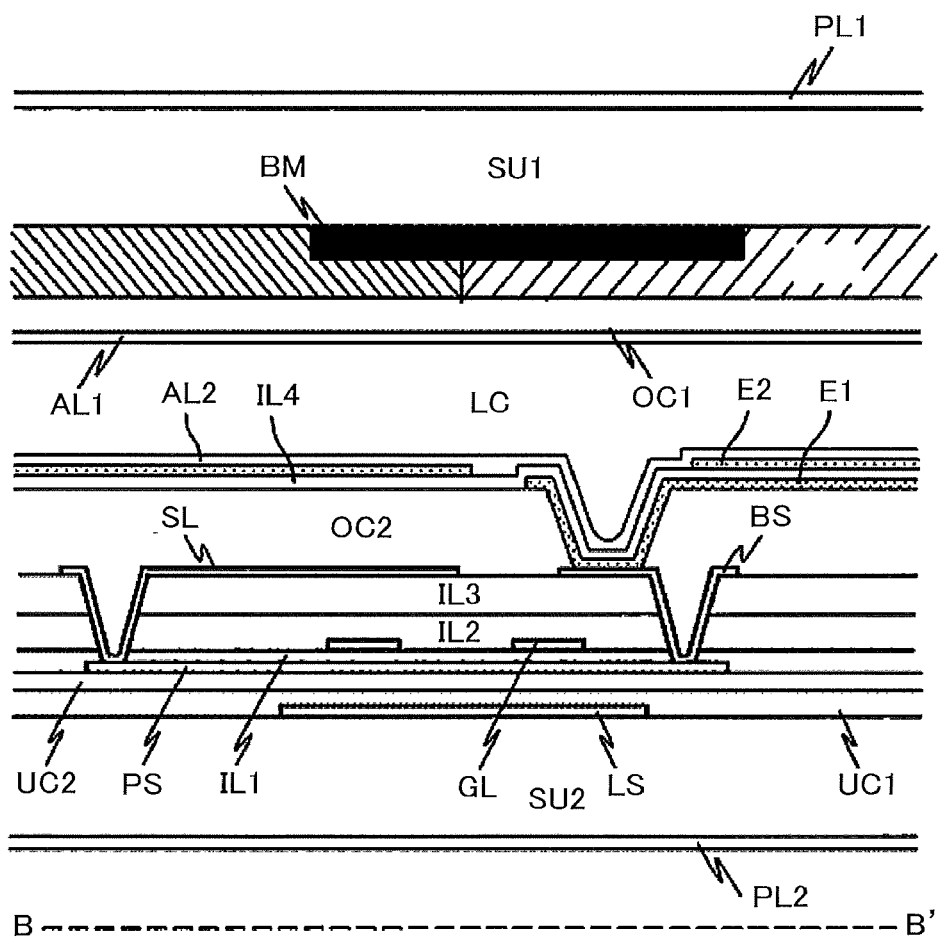
FIG. 13B is a cross sectional view along B-B' line in FIG. 2A according to seventh embodiment.

The seventh embodiment has a simpler layer structure as depicted in FIGS. 13A and 13B compared with the structure of the liquid crystal display device of the first embodiment. FIG. 13A is a cross sectional view at the center of the pixel while FIG. 13B is a cross sectional view at the area that includes the low temperature poly-silicon PS. Comparing FIGS. 13A and 13B with FIGS. 2A and 2B, it is apparent that the first electrode E1 and the fourth insulating film IL4 in FIGS. 2A and 2B are eliminated in FIGS. 13A and 13B.

In this embodiment, the holding capacitance is formed only by the overlapping portions between the first electrode E1 and the second electrode E2; however, in a high frequency display, the flicker will not occur since holding time is short. On the other hand, if High-K film, which has a high dielectric constant, is used for the fourth insulating film, there is a possibility that enough holding capacitance can be formed even the capacitive insulating film is only one layer. Examples of the material for the High-K film are aluminum oxide, Hafnium oxide, praseodymium oxide, etc. In this case, the first electrode E1 is applied with the source voltage while the second electrode E2 is applied with the common voltage; this structure is so called a common top structure.

In this case, too, the contact hole CH exists at the center of the pixel, the portion, which is not covered by the black matrix BM, of the slit of the second electrode E2 is located at the center of the pixel. Consequently, if the slit of the second electrode E2 either includes a contact hole CH inside or bypasses the contact hole CH in a plan view, the domain can be stably fixed and high transmittance of light can be attained.

Eighth Embodiment

Figure 14A:
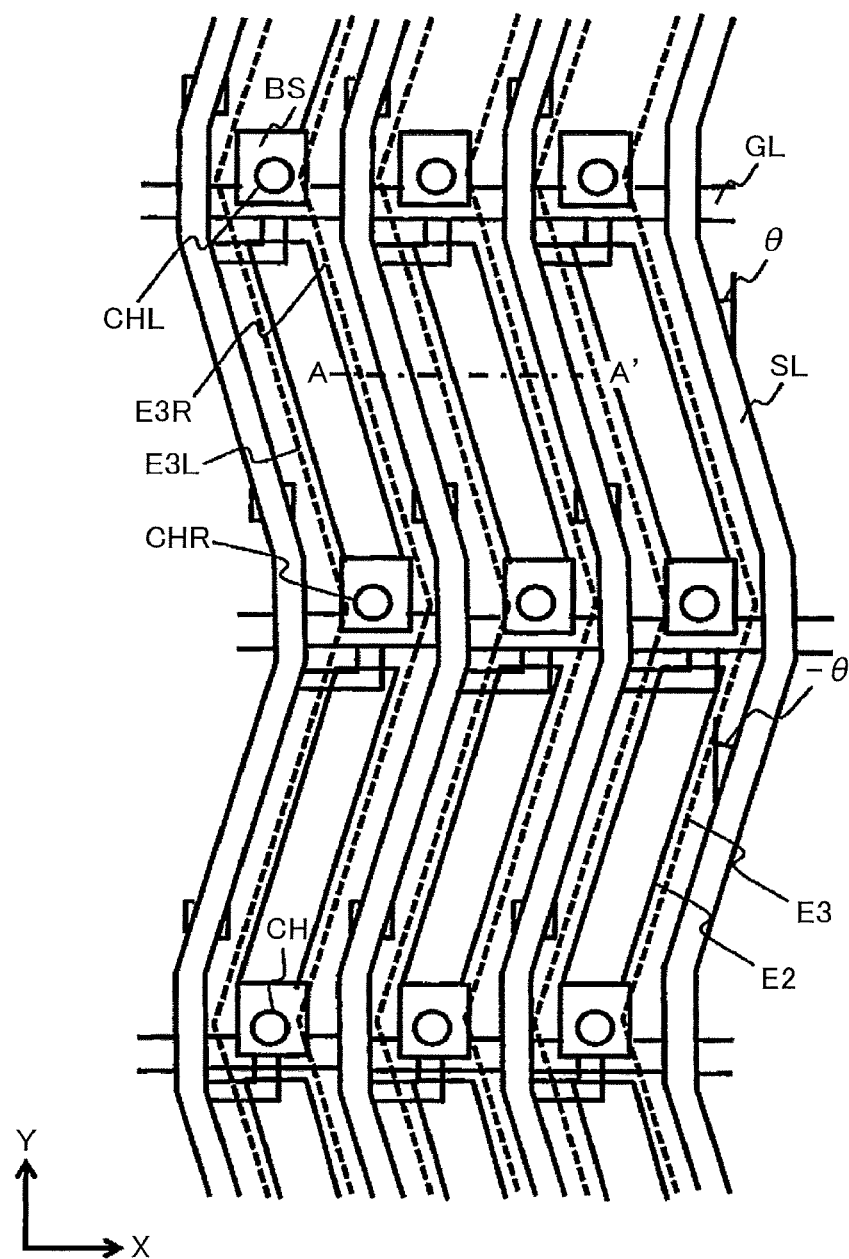
FIG. 14A is a plan view of the pixel according to eighth embodiment.
Figure 14B:
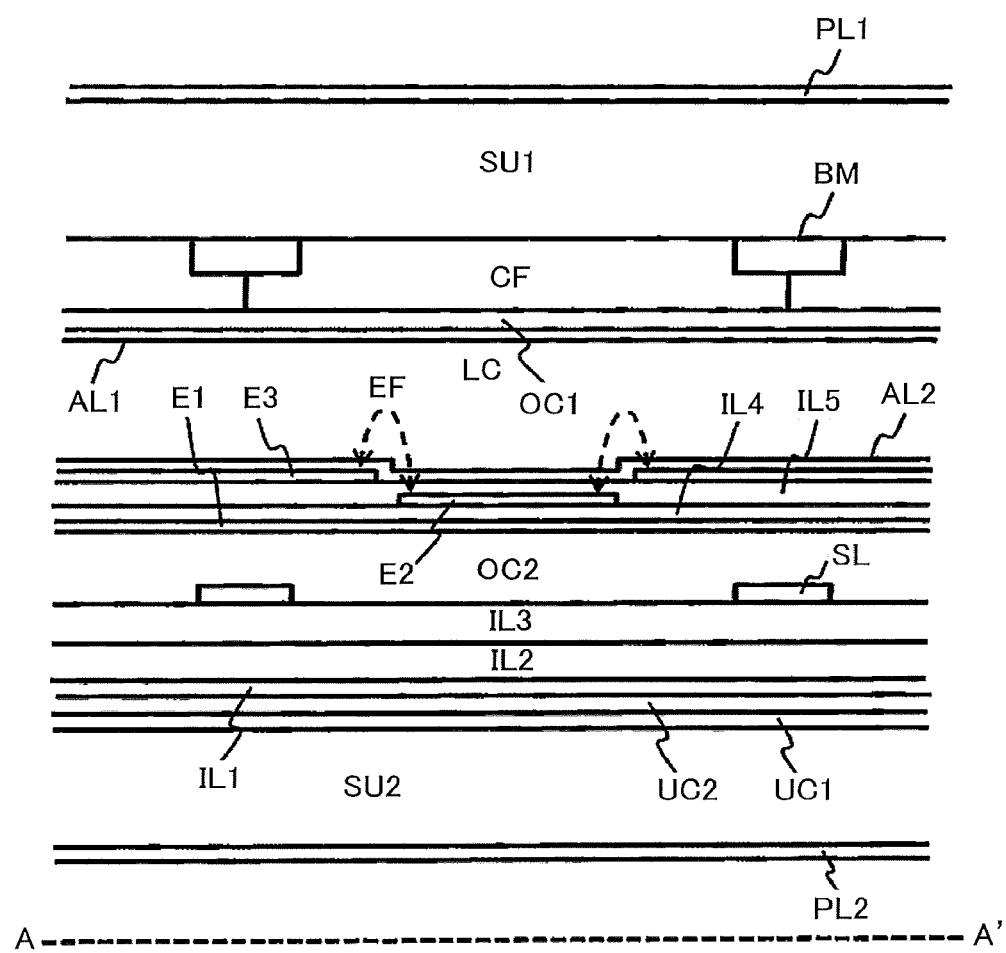
FIG. 14B is a cross sectional view along A-A' line in FIG. 14A according to eighth embodiment.
Figure 14C:
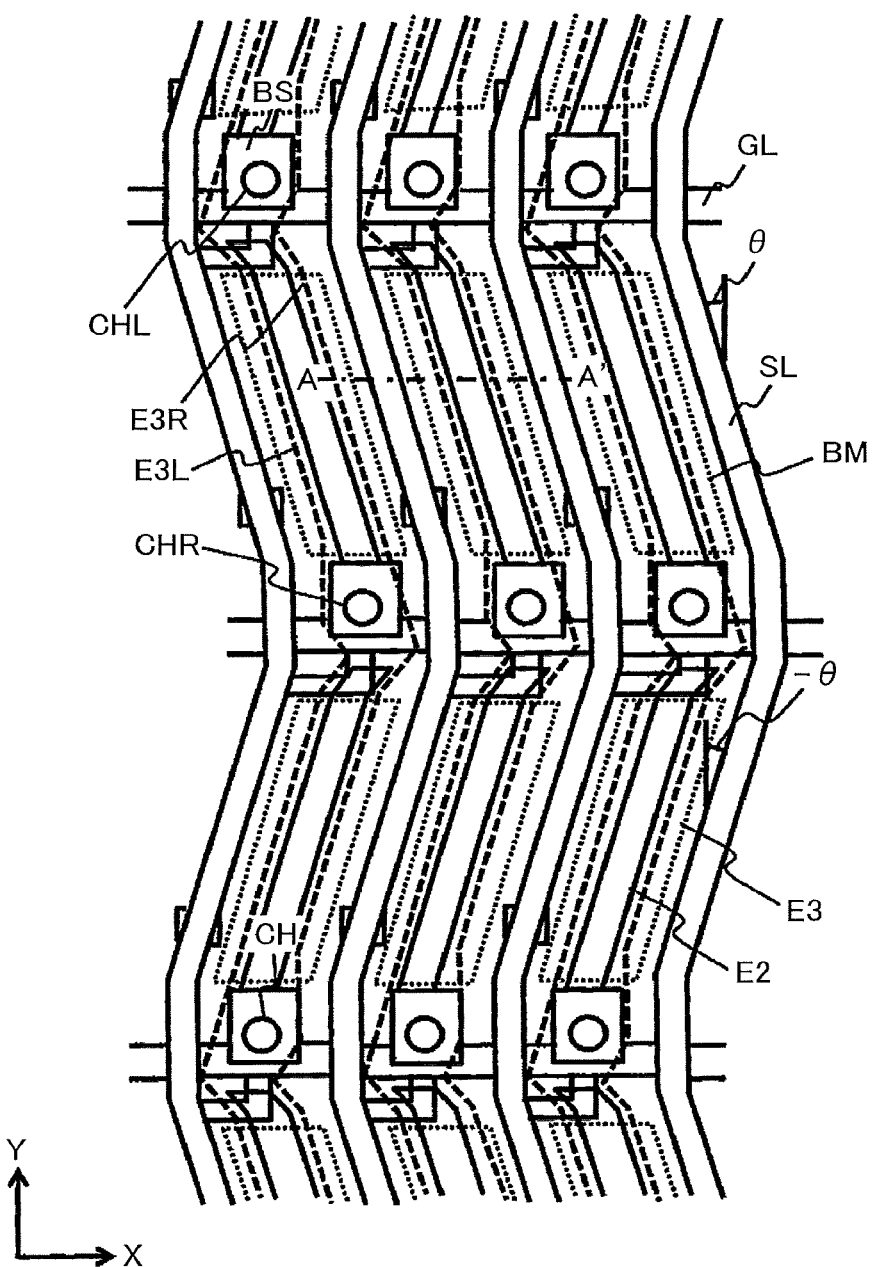
FIG. 14C is a plan view of the pixel according to eighth embodiment.

In the eighth embodiment, as depicted in FIGS. 14A-14C, the width of the slit is made as big as possible to include the second electrode E2 inside of the slit in a plan view. The slit is wide enough to avoid overlapping of the second electrode E2 and the third electrode E3, and further, to include the contact hole CH inside of the slit. The distance between the edge of the slit and the second electrode E2 can be made bigger because the second electrode E2 is formed inside of the slit.

In the structure that the second electrode E2 and the third electrode E3 do not overlap, the holding capacitance becomes smaller; however, as depicted in FIG. 14B, a necessary amount of holding capacitance can be formed because the first electrode E1 and the second electrode E2 overlap. The contact hole CH is formed at the center between the two adjacent video signal lines SL. The video signal line SL meanders to left and right (in the first direction X), the contact holes CH also moves to left and right according to the meander of the video signal line SL; consequently, the contact hole CH that moves to the left and the contact hole CH that moves to the right with respect to the second direction Y are formed. Herein after the contact hole CH moved to the left is called left deviated contact hole CHL and the contact hole CH moved to the right is called right deviated contact hole CHR.

The left deviated contact hole CHL and the right deviated contact hole CHR are arranged alternatively in up and down direction, namely in the second direction Y, in FIG. 14A. In other words, the left deviated contact hole CHL and the right deviated contact hole CHR sandwich the scan line GL in the second direction, and are used to connect the second electrode E2 in each of the pixels to the same video signal line SL. The slit has the right slit boundary E3R and the left slit boundary E3L. The right slit boundary E3R is formed in vicinity of the right hand edge of the left deviated contact hole CHL and the left slit boundary E3L is formed in vicinity of the left hand edge of the right deviated contact hole CHR to avoid overlapping of the contact hole CH and the slit boundaries E3R and E3L.

In the meantime, as explained before, if the slit boundary is located near to the pixel boundary, the alignment of the liquid molecules of the liquid crystal layer LC influences to the adjacent pixel, thus several problems arise as e.g. that the color purity is deteriorated when primary color is displayed.

FIG. 14C is the structure that countermeasures the above problem. In FIG. 14C, as explained in e.g. FIG. 2A, the tilting angle of the slit boundary is changed from the tilting angle of the video signal line SL to make the width of the slit at the contact hole CH bigger, thus, to form enough space between the slit boundary and the pixel boundary in the main area including A-A' line. In FIG. 14C, the same as FIG. 14A, the slit is formed between the adjacent two video signal lines SL; the second electrode E2 is formed inside of the slit. In FIG. 14C, the slit boundary is more apart from the adjacent pixel than that in FIG. 14A. In FIG. 14C, at the upper part of the figure, the right slit boundary E3R, which is near to the left deviated contact hole CHL, changes its direction from the second angle −θ to the second direction Y to avoid the right edge of the left deviated contact hole CHL. (In other words, the angle in absolute value of the right slit boundary with respect to the second direction Y decreases, thus, the width of the slit in the first direction X becomes bigger.) The right slit boundary E3R changes its direction, when it goes over the left deviated contact hole CHL, back to the second angle −θ; the right slit boundary E3R changes its direction in an angle bigger than the first angle θ near the scan line GL; the right slit boundary E3R changes its direction at the opening of the black matrix BM in the first angle θ and extends along the second electrode E2 until it goes over the right deviated contact hole CHR in the first angle θ. Further, the right slit boundary E3R changes its direction in an angle bigger than the second angle −θ with respect to the second direction Y, and it changes its direction near the opening of the black matrix BM in the second angle −θ. In the meantime, the second electrode E2 also tilts at an angle bigger than the first angle θ corresponding to the place where the right slit boundary E3R tilt with the first angle θ.

In FIG. 14C, at the upper part of the figure, the left slit boundary E3L, which is near to the left deviated contact hole CHL, extends with the second angle −θ until it goes over the left deviated contact hole CHL; it changes its direction in an angle bigger than the first angle θ near the scan line GL. The left slit boundary E3L changes its direction at the opening of the black matrix BM in the first angle θ and extends along the second electrode E2 to the right deviated contact hole CHR; when the left slit boundary E3L approaches to the right deviated contact hole CHR, it changes its direction from the first angle θ to the second direction Y to avoid the left edge of the right deviated contact hole CHR. (In other words, the angle in absolute value of the right slit boundary with respect to the second direction Y decreases, thus, the width of the slit in the first direction X becomes bigger.)

The left slit boundary E3L changes its direction, when it goes over the right deviated contact hole CHR, back to the first angle θ; it changes its direction in an angle bigger than the second angle −θ near the scan line GL; the left slit boundary E3L changes its direction at the opening of the black matrix BM in the second angle −θ.

According to the structure of FIG. 14C, the second electrode E2 can be formed inside of the slit, and the slit boundary can be set apart from the adjacent pixel with enough distance.

First Comparative Example

Figure 15:
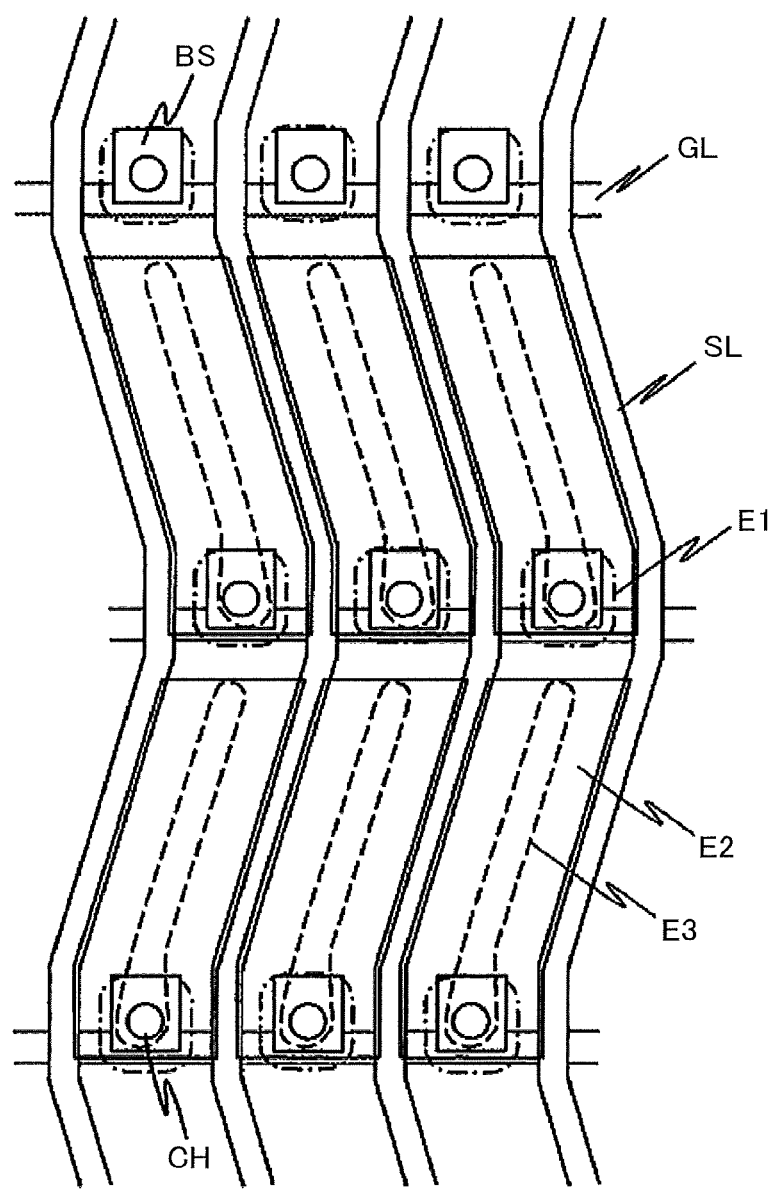
FIG. 15 is a plan view of first comparative example.

FIG. 15 is a plan view of the first comparative example. The first comparative example differs from the liquid crystal display device of the first embodiment in that the slit of the third electrode E3 is not continuous in plural pixels, but the slit is formed independently in individual pixels; further, the outer shape of the slit is formed by simple lines. The slit includes the contact hole CH inside.

The both edges of the slit are rounded since the corner angles that exist in mask data disappear after etching; consequently, the part where the liquid crystal molecules are rotated in reverse direction appears, thus, the domain is generated. In the boundary between the normal region and the domain, the liquid crystal molecules cannot rotate because the force to rotate the liquid crystal molecules in the normal direction and the force to rotate the liquid crystal molecules in the reverse direction compete; as a result, this area appears as the dark line.

Since irregularities in brightness were visually observed in the images of the display device that is formed according to the first comparative example, the state of the pixel was observed with an optical microscope; then, the domain was found. The domain extended to the area that the black matrix BM does not cover, further, the size of the domain was different from pixel to pixel. The domain extended from an edge of the pixel to a center of the pixel in some pixels; further domains fused together in some other pixels. Since the domain extends to the area that is not covered by black matrix BM, irregularities in brightness were observed in the first comparative example.

Second Comparative Example

Figure 16:
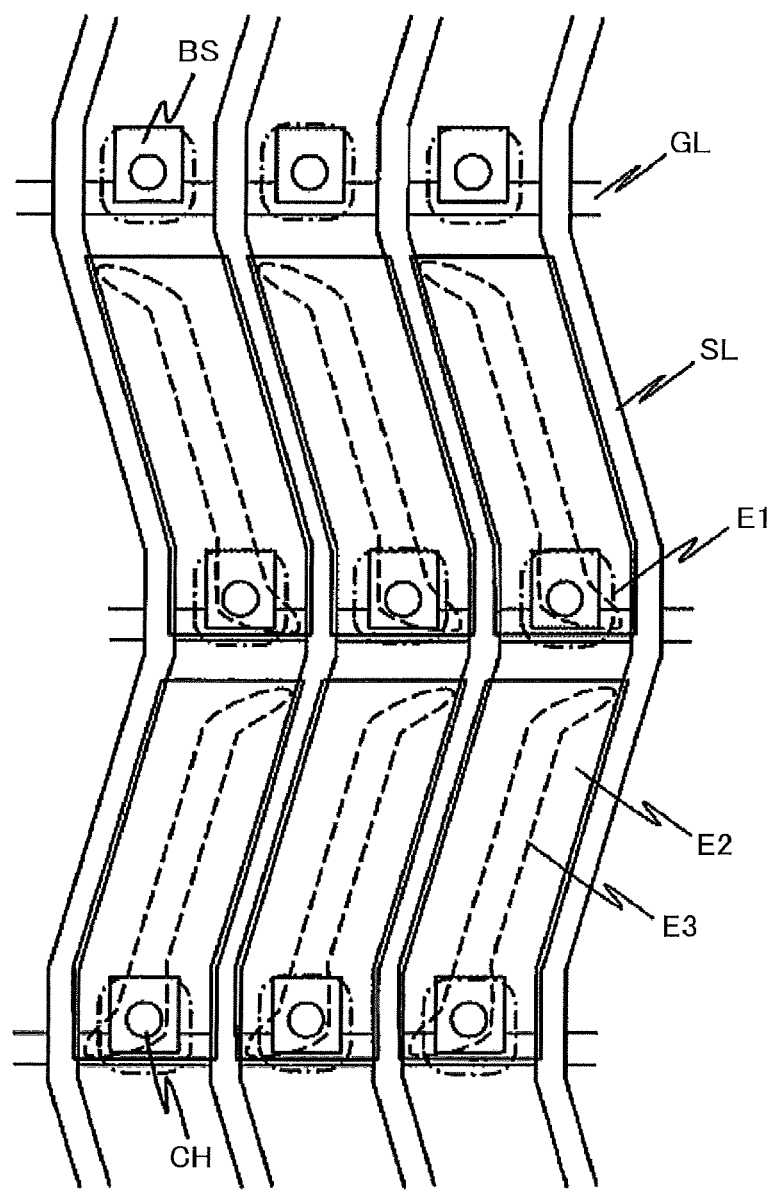
FIG. 16 is a plan view of second comparative example.

FIG. 16 is a plan view of the second comparative example. The second comparative example differs from the liquid crystal display device of the first embodiment in that the slit of the third electrode E3 is not continuous in plural pixels, but the slit is formed independently in individual pixels, further the slit is bent at the both ends. The slit includes the contact hole CH inside.

Even the domains are generated at the both ends of the slit, domains were fixed in the bent areas of the slit. In the bent area, however, the rotation angle of the liquid crystal molecules is small when voltage is applied; thus, transmittance of light is low at the bent portions. In addition, in the high definition pixels, the ratio of the bent area in the pixel is big, thus, the bent area is to be formed even in an area that is not covered by black matrix; consequently, the light transmittance decreases in the second comparative example.

Third Comparative Example

Figure 17A:
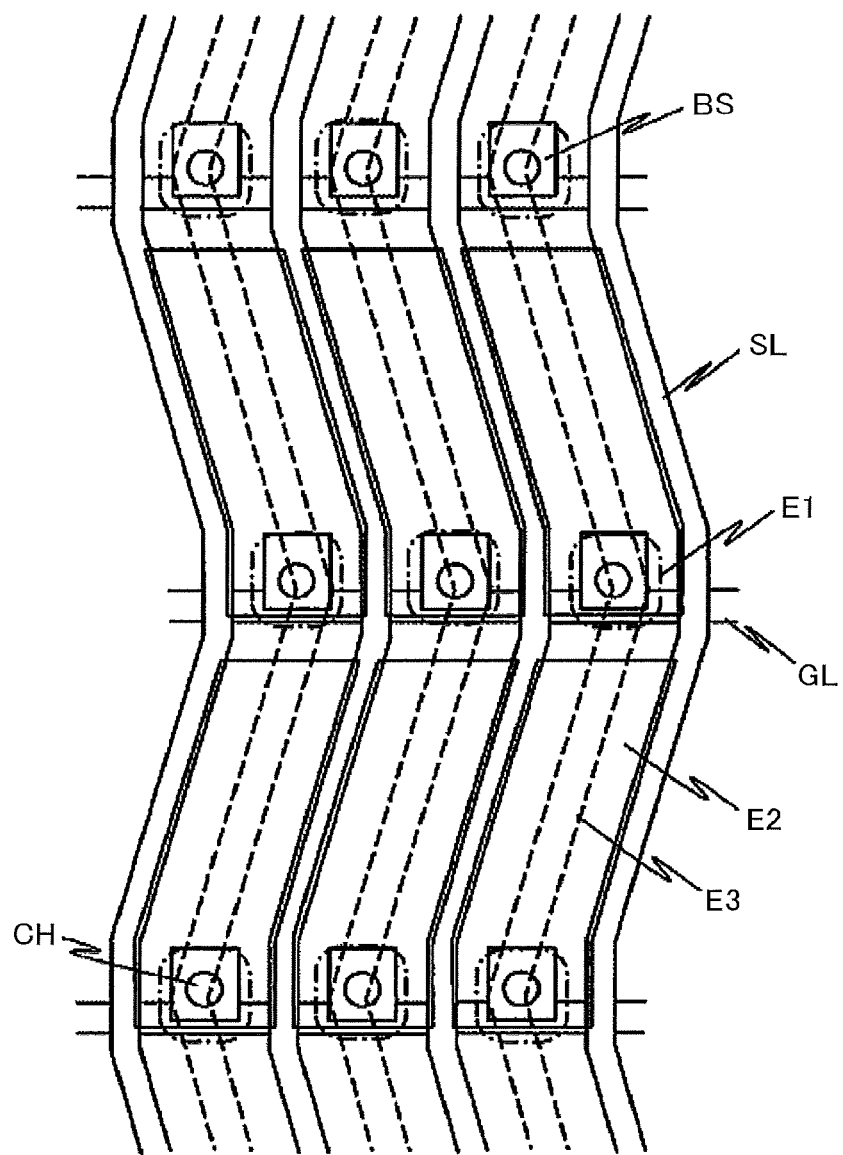
FIG. 17A is a plan view of an example according to the present invention.

In the third comparative example, the mask pattern for the slit of third electrode E3 is continuous in plural pixels, however, bending structure is not adopted at the end of the pixel; thus, the slit boundary overlaps with the contact hole CH. FIG. 17A shows the slit is formed as the mask pattern in the photography, wherein one of the boundaries of the slit of the third electrode E3 overlaps with the contact hole CH. As depicted in FIG. 17A, if the slit is formed continuously in plural pixels, some merit of the present invention can be enjoyed.

Figure 17B:
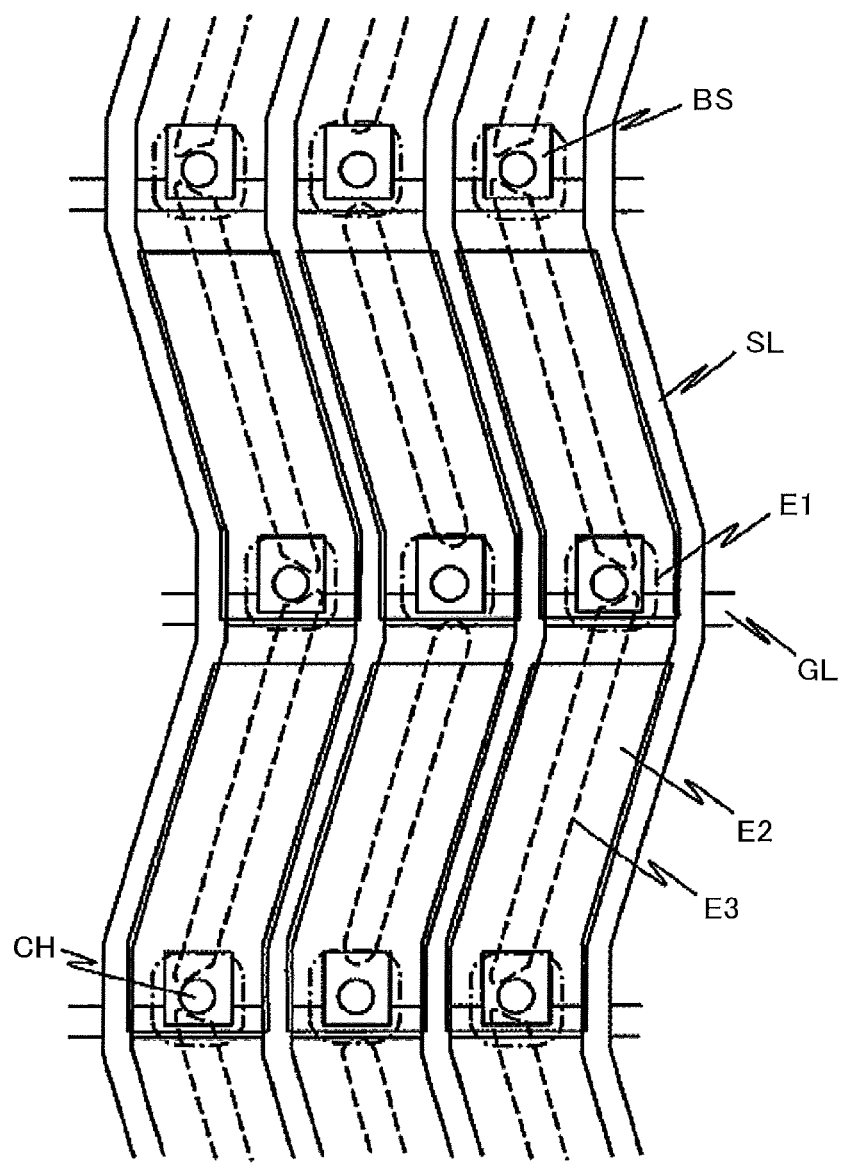
FIG. 17B is a plan view of third comparative example.

If the mask pattern is as FIG. 17A, however, there is a chance that the slit is not formed continuously in plural pixels. FIG. 17B is one example of such a case, wherein the slit is not formed in the area that overlaps with the contact hole CH.

Further, the slits of the third electrode E3 are different from pixel to pixel. In FIG. 17B, the slit is formed nearer to the contact hole CH in the pixels in the outer columns; on the other hand, the slit in the pixels in the middle column is apart from the contact hole CH and the ends of the slit are round. The domain is generated in the slit in the pixel in the middle column; further, the domain extends to the area that is not covered by the black matrix. Since there are pixels that the domain extends and pixels that domain does not appear, the nonuniformity in brightness was observed.

Fourth Comparative Example

The fourth comparative example differs from the liquid crystal display device of the first embodiment in that the slit of the third electrode E3 is not continuous in plural pixels, but the slit is formed independently in individual pixels, further the slit is bent at the both ends. To make more simple structure, the slit is made so as two-fold rotational symmetry; under this structure, the slit overlaps with the contact hole CH.

Figure 18A:
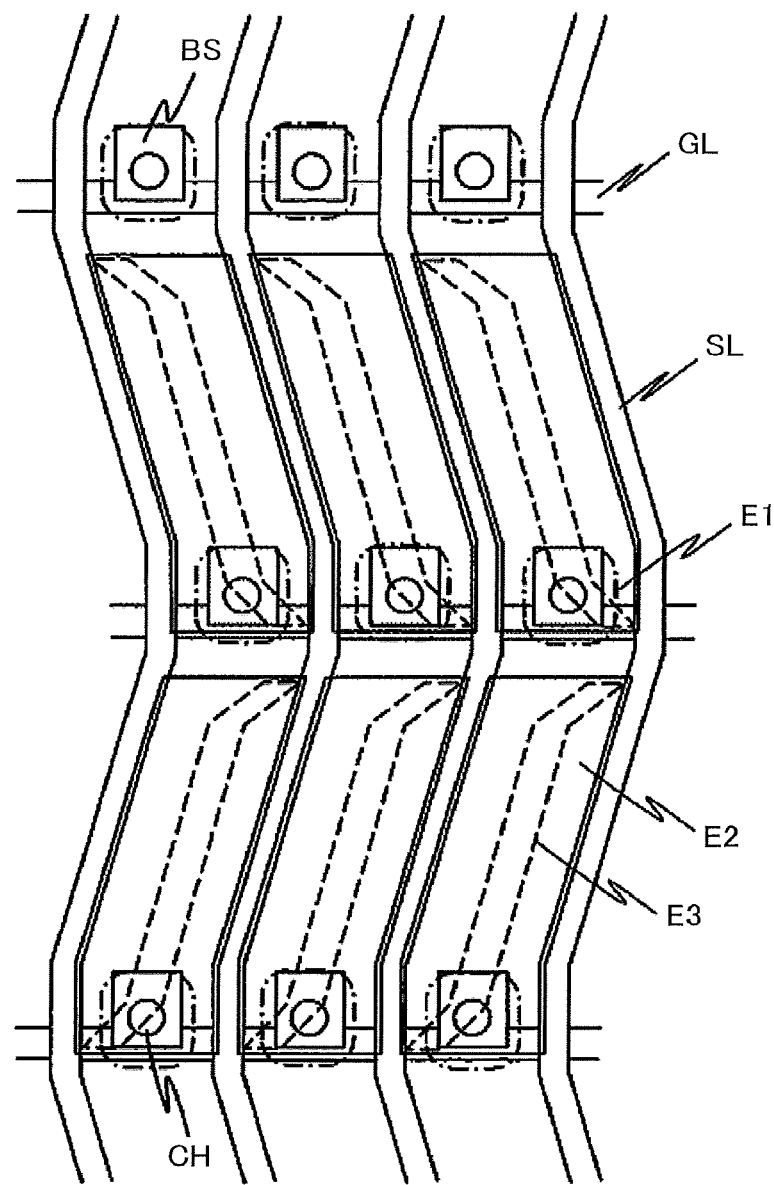
FIG. 18A is a plan view of fourth comparative example.

FIG. 18A shows the slit is formed as the mask pattern in the photolithography, wherein one of the boundaries of the slit of the third electrode E3 overlaps with the contact hole CH. Since the distance between the base electrode layer BS and the video signal line SL must be constant, the video signal line SL is obliged to extend parallel to the base electrode layer BS; consequently, the shape of the pixel becomes as that the parallelogram is combined with by the rectangle. In addition to that the contact hole CH must be on the base electrode layer BS in a plan view; thus, the above shaped slit necessarily overlaps with the contact hole CH.

Figure 18B:
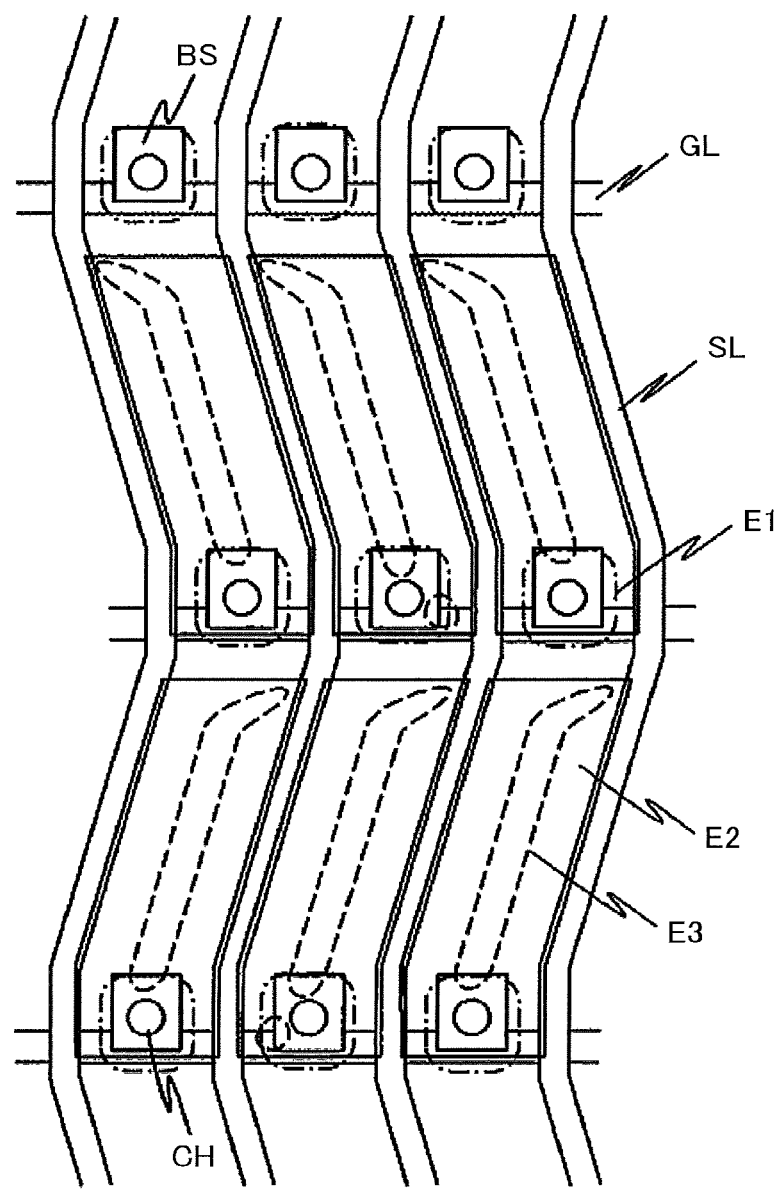
FIG. 18B is a plan view of another fourth comparative example.

FIG. 18B is a plan view of the slits that are actually formed. The structures of the slits are little bit different from pixel to pixel; however, slits are not formed at the area that overlaps with the contact hole CH in all the pixels. Further, the edge of the slit is deviated from the contact hole CH to the center of the pixel, and is round; the domain was generated from the edge as the starting point. The domain extended to the area that is not covered by the black matrix, further extensions of the domains are different from pixel to pixel; thus, nonuniformity in brightness was observed.

What is claimed is:
1. A liquid crystal display device comprising:
   a scan line extends in a first direction;
   a video signal line extends in a direction of tilting angle of θ1 with respect to a second direction that is perpendicular to the first direction, and, after crossing the scan line, extends in a direction of tilting angle of −θ1 with respect to the second direction; and
   a pixel formed in an area surrounded by scan line and the video signal line,
   wherein
   the pixel includes: a thin film transistor, a flattening film that covers the thin film transistor, a first electrode formed on the flattening film, a second electrode formed over the first electrode via a first insulating film, a third electrode formed over the second electrode via a second insulating film, and a contact hole that is formed in the flattening film to connect the second electrode and the thin film transistor,
   the first electrode is formed in common in plural pixels,
   the third electrode is formed in common in plural pixels, the third electrode has a plurality of slits in parallel to the video signal line,
- only one slit is formed in the pixel,
- the one slit continuously extends across the scan line, and is formed in common in a plurality of pixels arranged in the second direction, and
- an extending direction of the one slit changes its direction at least once in the pixel,
- wherein the first electrode and the third electrode are common electrode,
- the second electrode is a pixel electrode, and
- the one slit overlaps the contact hole and extends across the contact hole.

2. The liquid crystal display device according to claim 1, wherein a first width of the one slit in the first direction at the contact hole is bigger than a second width of the one slit in the first direction at a portion extending along the video signal line.

3. The liquid crystal display device according to claim 1, wherein the contact hole exists in the one slit.

4. The liquid crystal display device according to claim 1, wherein the contact hole does not overlap the one slit.

* * * * *